United States Patent
Brar et al.

(10) Patent No.: US 12,222,991 B2
(45) Date of Patent: *Feb. 11, 2025

(54) ANOMALY DATABASE SYSTEM FOR PROCESSING TELEMETRY DATA

(71) Applicant: Rubrik, Inc., Palo Alto, CA (US)

(72) Inventors: Gurashish Singh Brar, Belmont, CA (US); Karan Jayesh Bavishi, San Francisco, CA (US); Gurjeet S. Arora, Sunnyvale, CA (US)

(73) Assignee: Rubrik, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/886,088

(22) Filed: Aug. 11, 2022

(65) Prior Publication Data

US 2022/0382812 A1 Dec. 1, 2022

Related U.S. Application Data

(63) Continuation of application No. 17/068,209, filed on Oct. 12, 2020, now Pat. No. 11,436,285.

(51) Int. Cl.
*G06F 16/903* (2019.01)
*G06F 16/2458* (2019.01)
(Continued)

(52) U.S. Cl.
CPC ........ *G06F 16/906* (2019.01); *G06F 16/2471* (2019.01); *G06F 16/90335* (2019.01);
(Continued)

(58) Field of Classification Search
CPC ............... G06F 16/906; G06F 16/2471; G06F 16/90335; G06F 16/182; G06F 16/188; G06F 16/2462; G06F 17/18; G06F 11/1471; G06F 11/0751; G06F 11/1451; G06F 11/1453; G06F 11/1464; G06F 11/2094; G06F 11/3006; G06F 11/3034; G06F 11/3409; G06F 11/3447; G06F 11/3452; G06F 11/3466; G06F 2201/88; G06F 2201/815; G06F 2201/84; H04L 65/613;
(Continued)

(56) References Cited

U.S. PATENT DOCUMENTS

2016/0234087 A1* 8/2016 Nyerges ................. H04L 45/02
2018/0365298 A1 12/2018 Poghosyan et al.
(Continued)

OTHER PUBLICATIONS

U.S. Appl. No. 17/068,209, filed Oct. 12, 2020, Patented, U.S. Pat. No. 11,436,285.

*Primary Examiner* — Irete F Ehichioya
*Assistant Examiner* — Xiaoqin Hu
(74) *Attorney, Agent, or Firm* — Holland & Hart LLP

(57) ABSTRACT

In some examples, an anomaly database system is provided for processing metrics in telemetry data. An example anomaly database system comprises a continuous data management (CDM) node, the CDM node including a metrics library for sending out system metrics in a sparse manner and a statistics relay for receiving streaming metrics from nodes in a node cluster, the node cluster including the CDM node, the statistics relay pushing the received metrics to a metrics collector. A sparse consumers module pulls metrics, from the metrics collector, pushed to the metrics collector by the statistics relay.

17 Claims, 24 Drawing Sheets

(51) Int. Cl.
*G06F 16/906* (2019.01)
*G06F 17/18* (2006.01)
*H04L 65/613* (2022.01)
*H04L 65/65* (2022.01)

(52) U.S. Cl.
CPC ............ *G06F 17/18* (2013.01); *H04L 65/613* (2022.05); *H04L 65/65* (2022.05)

(58) Field of Classification Search
CPC ..... H04L 65/65; H04L 65/61; H04L 65/4061; H04L 65/80
See application file for complete search history.

(56) References Cited

U.S. PATENT DOCUMENTS

| | | | |
|---|---|---|---|
| 2019/0294485 A1* | 9/2019 | Kukreja | ............. G06F 11/0772 |
| 2021/0294818 A1 | 9/2021 | Savalle et al. | |
| 2022/0114216 A1 | 4/2022 | Brar et al. | |

* cited by examiner

| Category | Num Series | Recommended Sparseness Algo | Drop Rate (seen) |
|---|---|---|---|
| Counters | 16104 (23.13%) | Require transformation | > 90% |
| Meters | 4819 (06.92%) | Last value delta or Last value delta with percentile | ~70-90% |
| Histograms | 15325 (22.01%) | Stddev + last value delta | >90% |
| Gauges | 33370 (47.93%) | Last value delta | ~70-90% |

FIG. 13

| Influx | Druid |
|---|---|
| Measurement | DataSource |
| Tags | Dimensions: optional |
| Field Names | Special Dimension : Field |
| Field Values | Metric: Value |

Druid Schema

| Time<br>long, indexed | Cluster<br>str, indexed | Node<br>str, indexed | Field<br>str, indexed | Value<br>float, not-indexed |
|---|---|---|---|---|
| 10 | c1 | n1 | cpu | 10 |
| 10 | c1 | n1 | disk | 5 |
| 11 | c1 | n1 | cpu | 12 |
| 12 | c1 | n2 | disk | 7 |

| Time | Field | Value |
|---|---|---|
| 10 | clusters.c1.n1.Process.influx.cpu_percent | 10 |
| 10 | clusters.c1.n2.Process.influx.cpu_percent | 5 |
| 11 | clusters.c2.n1.Process.cockroach.cpu_percent | 12 |
| 12 | clusters.c2.n2.Process.cockroach.cpu_percent | 7 |

METHOD 2100 MAY INCLUDE EXAMPLE OPERATIONS:

2102 RECEIVING BY A STATISTICS RELAY STREAMING METRICS FROM NODES IN A NODE CLUSTER, THE NODE CLUSTER INCLUDING THE CDM NODE, THE STATISTICS RELAY PUSHING THE RECEIVED METRICS TO A METRICS COLLECTOR

2104 PULLING METRICS, BY A SPARSE CONSUMERS MODULE, FROM THE METRICS COLLECTOR.

ANOMALY DATABASE SYSTEM FOR PROCESSING TELEMETRY DATA

CROSS-REFERENCE TO RELATED APPLICATIONS

This application is a continuation of U.S. patent application Ser. No. 17/068,209 by Brar et al., entitled "Anomaly Database System for Processing Telemetry Data" and filed Oct. 12, 2020, which is assigned to the assignee hereof and incorporated by reference herein in its entirety.

FIELD

The present disclosure relates generally to computer architecture software for a data management platform and, in some more particular aspects, to an anomaly database system for processing telemetry data.

BACKGROUND

The volume and complexity of data that is collected, analyzed and stored is increasing rapidly over time. The computer infrastructure used to handle this data is also becoming more complex, with more processing power and more portability. As a result, data management and storage is becoming increasingly important. Significant issues of these processes include access to reliable data backup and storage, and fast data recovery in cases of failure. Other aspects include data portability across locations and platforms.

Telemetry data includes information about a system or a device and how it is configured including hardware attributes such as central processing unit (CPU) usage, installed memory, and storage, as well as quality-related information such as uptime and sleep details and numbers of crashes or hangs. In incident reporting and remediation, for example, a lack of telemetric data can slow down Mean Time To Repair (MTTR) and only be sufficient for identifying that a problem has occurred but not good enough to identify a root cause of a failure.

BRIEF SUMMARY

In some examples, an anomaly database system is provided for processing metrics in telemetry data. An example anomaly database system comprises a continuous data management (CDM) node, the CDM node including a metrics library for sending out system metrics in a sparse manner; a statistics relay for receiving streaming metrics from nodes in a node cluster, the node cluster including the CDM node, the statistics relay pushing the received metrics to a metrics collector; and a sparse consumers module to pull metrics, from the metrics collector, pushed to the metrics collector by the statistics relay.

In some examples, the sparse consumers module includes at least one processor configured to run a sparse algorithm on the pulled metrics to reduce a number of data points. In some examples, the sparse algorithm is selected from a group of sparse algorithms comprising: a diff-value algorithm, a last-value-delta algorithm, a standard deviation band algorithm, a standard deviation band algorithm with a last-value fallback, and a last-value-delta with percentile algorithm. In some examples, values generated by the sparse algorithm are bounded and assigned a publication status based on falling within a bounded value.

In some examples, the anomaly database system further comprises a rollup module to enable read queries over a designated time range.

In some examples, the anomaly database system further comprising a baseline estimator to pre-compute baselines on the streaming metrics to enable anomaly detection, correlations and multi-series sparseness.

BRIEF DESCRIPTION OF THE SEVERAL VIEWS OF THE DRAWINGS

Some embodiments are illustrated by way of example and not limitation in the views of the accompanying drawing:

FIG. 13 illustrates an aspect of the subject matter in accordance with one embodiment.

FIG. 17 illustrates an aspect of the subject matter in accordance with one embodiment.

FIG. 18 illustrates an aspect of the subject matter in accordance with one embodiment.

FIG. 19 illustrates an aspect of the subject matter in accordance with one embodiment.

FIG. 21 depicts a block flow chart indicating example operations in a method, according to example embodiments.

DETAILED DESCRIPTION

Figure 1:
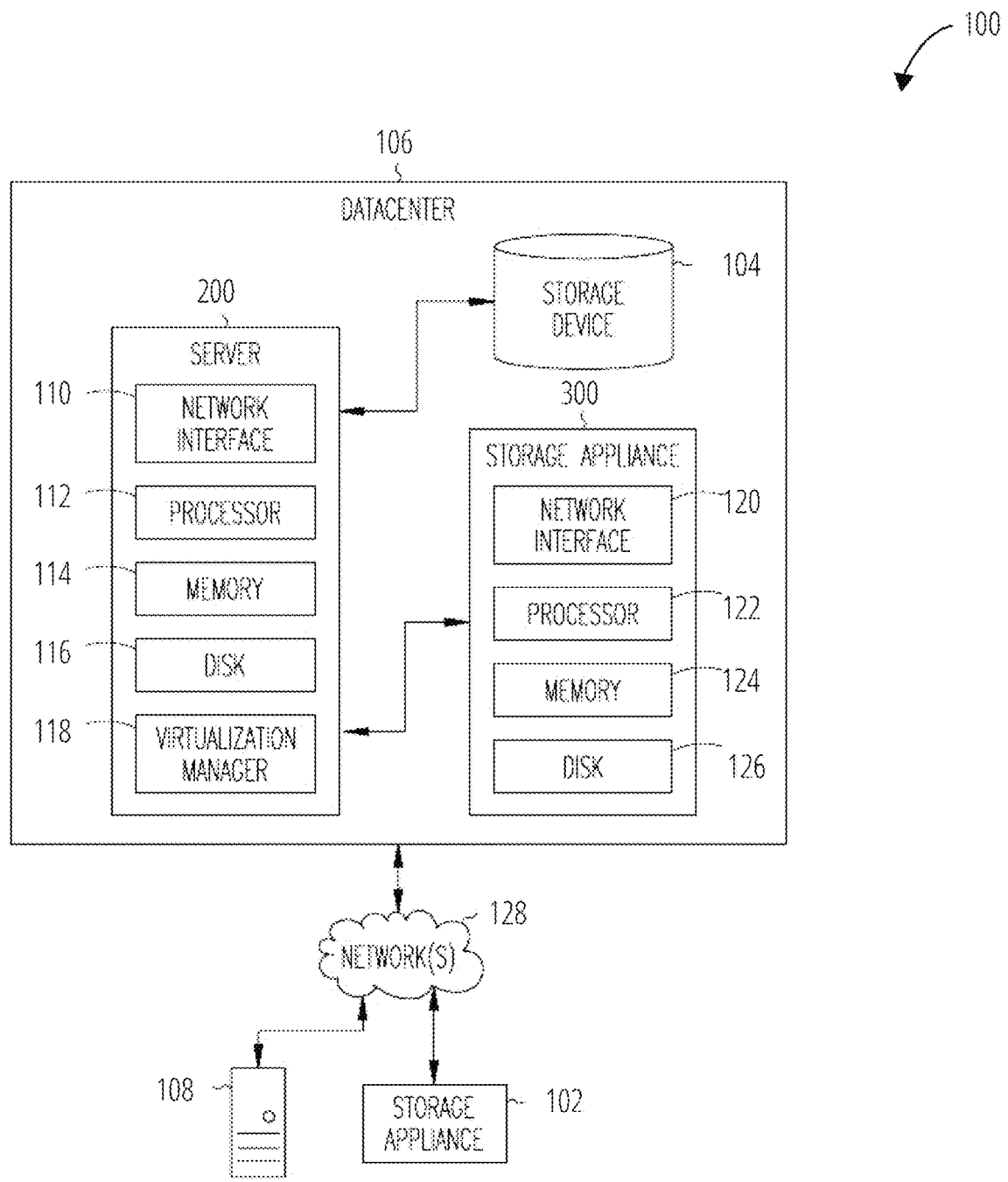
FIG. 1 depicts one embodiment of a networked computing environment in which the disclosed technology may be practiced, according to an example embodiment.

The description that follows includes systems, methods, techniques, instruction sequences, and computing machine program products that embody illustrative embodiments of the present disclosure. In the following description, for purposes of explanation, numerous specific details are set forth in order to provide a thorough understanding of example embodiments. It will be evident, however, to one skilled in the art that the present inventive subject matter may be practiced without these specific details.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright Rubrik, Inc., 2020, All Rights Reserved.

It will be appreciated that some of the examples disclosed herein are described in the context of virtual machines that are backed up by using base and incremental snapshots, for example. This should not necessarily be regarded as limiting of the disclosures. The disclosures, systems and methods described herein apply not only to virtual machines of all types that run a file system (for example), but also to network-attached storage (NAS) devices, physical machines (for example Linux servers), and databases.

FIG. 1 depicts one embodiment of a networked computing environment 100 in which the disclosed technology may be practiced. As depicted, the networked computing environment 100 includes a data center 106, a storage appliance 102, and a computing device 108 in communication with each other via one or more networks 128. The networked computing environment 100 may also include a plurality of computing devices interconnected through one or more networks 128. The one or more networks 128 may allow computing devices and/or storage devices to connect to and communicate with other computing devices and/or other storage devices. In some cases, the networked computing environment 100 may include other computing devices and/or other storage devices not shown. The other computing devices may include, for example, a mobile computing device, a non-mobile computing device, a server, a workstation, a laptop computer, a tablet computer, a desktop computer, or an information processing system. The other storage devices may include, for example, a storage area network storage device, a networked-attached storage device, a hard disk drive, a solid-state drive, or a data storage system.

The data center 106 may include one or more servers, such as server 200, in communication with one or more storage devices, such as storage device 104. The one or more servers may also be in communication with one or more storage appliances, such as storage appliance 102. The server 200, storage device 104, and storage appliance 300 may be in communication with each other via a networking fabric connecting servers and data storage units within the data center 106 to each other. The storage appliance 300 may include a data management system for backing up virtual machines and/or files within a virtualized infrastructure. The server 200 may be used to create and manage one or more virtual machines associated with a virtualized infrastructure.

The one or more virtual machines may run various applications, such as a database application or a web server. The storage device 104 may include one or more hardware storage devices for storing data, such as a hard disk drive (HDD), a magnetic tape drive, a solid-state drive (SSD), a storage area network (SAN) storage device, or a NAS device. In some cases, a data center, such as data center 106, may include thousands of servers and/or data storage devices in communication with each other. The one or more data storage devices 104 may comprise a tiered data storage infrastructure (or a portion of a tiered data storage infrastructure). The tiered data storage infrastructure may allow for the movement of data across different tiers of a data storage infrastructure between higher-cost, higher-performance storage devices (e.g., solid-state drives and hard disk drives) and relatively lower-cost, lower-performance storage devices (e.g., magnetic tape drives).

The one or more networks 128 may include a secure network such as an enterprise private network, an unsecure network such as a wireless open network, a local area network (LAN), a wide area network (WAN), and the Internet. The one or more networks 128 may include a cellular network, a mobile network, a wireless network, or a wired network. Each network of the one or more networks 128 may include hubs, bridges, routers, switches, and wired transmission media such as a direct-wired connection. The one or more networks 128 may include an extranet or other private network for securely sharing information or providing controlled access to applications or files.

A server, such as server 200, may allow a client to download information or files (e.g., executable, text, application, audio, image, or video files) from the server 200 or to perform a search query related to particular information stored on the server 200. In some cases, a server may act as an application server or a file server. In general, server 200 may refer to a hardware device that acts as the host in a client-server relationship or a software process that shares a resource with or performs work for one or more clients.

One embodiment of server 200 includes a network interface 110, processor 112, memory 114, disk 116, and virtualization manager 118 all in communication with each other. Network interface 110 allows server 200 to connect to one or more networks 128. Network interface 110 may include a wireless network interface and/or a wired network interface. Processor 112 allows server 200 to execute computer-readable instructions stored in memory 114 in order to perform processes described herein. Processor 112 may include one or more processing units, such as one or more central processing units (CPUs) and/or one or more graphics processing units (GPUs). Memory 114 may comprise one or more types of memory, which may include random access memory (RAM), static RAM (SRAM), dynamic RAM (DRAM), read-only memory (ROM), electrically erasable programmable ROM (EEPROM), Flash, etc. Disk 116 may include a hard disk drive and/or a solid-state drive. Memory 114 and disk 116 may comprise hardware storage devices.

The virtualization manager 118 may manage a virtualized infrastructure and perform management operations associated with the virtualized infrastructure. The virtualization manager 118 may manage the provisioning of virtual machines running within the virtualized infrastructure and provide an interface to computing devices interacting with the virtualized infrastructure. In one example, the virtualization manager 118 may set a virtual machine having a virtual disk into a frozen state in response to a snapshot request made via an application programming interface (API) by a storage appliance, such as storage appliance 300. Setting the virtual machine into a frozen state may allow a point in time snapshot of the virtual machine to be stored or transferred. In one example, updates made to a virtual machine that has been set into a frozen state may be written to a separate file (e.g., an update file) while the virtual disk may be set into a read-only state to prevent modifications to the virtual disk file while the virtual machine is in the frozen state.

The virtualization manager 118 may then transfer data associated with the virtual machine (e.g., an image of the virtual machine or a portion of the image of the virtual disk file associated with the state of the virtual disk at the point in time it is frozen) to a storage appliance (for example, a storage appliance 102 or storage appliance 300 of FIG. 1, described further below) in response to a request made by the storage appliance. After the data associated with the point in time snapshot of the virtual machine has been transferred to the storage appliance 300 (for example), the virtual machine may be released from the frozen state (i.e., unfrozen) and the updates made to the virtual machine and stored in the separate file may be merged into the virtual disk file. The virtualization manager 118 may perform various virtual machine-related tasks, such as cloning virtual machines, creating new virtual machines, monitoring the state of virtual machines, moving virtual machines between physical hosts for load balancing purposes, and facilitating backups of virtual machines.

One embodiment of a storage appliance 300 (or storage appliance 102) includes a network interface 120, processor 122, memory 124, and disk 126 all in communication with each other. Network interface 120 allows storage appliance 300 to connect to one or more networks 128. Network interface 120 may include a wireless network interface and/or a wired network interface. Processor 122 allows storage appliance 300 to execute computer readable instructions stored in memory 124 in order to perform processes described herein. Processor 122 may include one or more processing units, such as one or more CPUs and/or one or more GPUs. Memory 124 may comprise one or more types of memory (e.g., RAM, SRAM, DRAM, ROM, EEPROM). Disk 126 may include a hard disk drive and/or a solid-state drive. Memory 124 and disk 126 may comprise hardware storage devices.

In one embodiment, the storage appliance 300 may include four machines. Each of the four machines may include a multi-core CPU, 64 GB of RAM, a 400 GB SSD, three 4 terabyte (TB) HDDs, and a network interface controller. In this case, the four machines may be in communication with the one or more networks 128 via the four network interface controllers. The four machines may comprise four nodes of a server cluster. The server cluster may comprise a set of physical machines that are connected together via a network. The server cluster may be used for storing data associated with a plurality of virtual machines, such as backup data associated with different point-in-time versions of the virtual machines.

The networked computing environment 100 may provide a cloud computing environment for one or more computing devices. Cloud computing may refer to Internet-based computing, wherein shared resources, software, and/or information may be provided to one or more computing devices on-demand via the Internet. The networked computing environment 100 may comprise a cloud computing environment providing Software-as-a-Service (SaaS) or Infrastructure-as-a-Service (IaaS) services. SaaS may refer to a software distribution model in which applications are hosted by a service provider and made available to end users over the Internet. In one embodiment, the networked computing environment 100 may include a virtualized infrastructure that provides software, data processing, and/or data storage services to end users accessing the services via the networked computing environment 100. In one example, networked computing environment 100 may provide cloud-based work productivity or business-related applications to a computing device, such as computing device 108. The storage appliance 102 may comprise a cloud-based data management system for backing up virtual machines and/or files within a virtualized infrastructure, such as virtual machines running on server 200/or files stored on server 200.

In some cases, networked computing environment 100 may provide remote access to secure applications and files stored within data center 106 from a remote computing device, such as computing device 108. The data center 106 may use an access control application to manage remote access to protected resources, such as protected applications, databases, or files located within the data center 106. To facilitate remote access to secure applications and files, a secure network connection may be established using a virtual private network (VPN). A VPN connection may allow a remote computing device, such as computing device 108, to securely access data from a private network (e.g., from a company file server or mail server) using an unsecure public network or the Internet. The VPN connection may require client-side software (e.g., running on the remote computing device) to establish and maintain the VPN connection. The VPN client software may provide data encryption and encapsulation prior to the transmission of secure private network traffic through the Internet.

In some embodiments, the storage appliance 300 may manage the extraction and storage of virtual machine snapshots associated with different point in time versions of one or more virtual machines running within the data center 106. A snapshot of a virtual machine may correspond with a state of the virtual machine at a particular point-in-time. In response to a restore command from the storage device 104, the storage appliance 300 may restore a point-in-time version of a virtual machine or restore point-in-time versions of one or more files located on the virtual machine and transmit the restored data to the server 200. In response to a mount command from the server 200, the storage appliance 300 may allow a point-in-time version of a virtual machine to be mounted and allow the server 200 to read and/or modify data associated with the point-in-time version of the virtual machine. To improve storage density, the storage appliance 300 may deduplicate and compress data associated with different versions of a virtual machine and/or deduplicate and compress data associated with different virtual machines. To improve system performance, the storage appliance 300 may first store virtual machine snapshots received from a virtualized environment in a cache, such as a flash-based cache. The cache may also store popular data or frequently accessed data (e.g., based on a history of virtual machine restorations, incremental files associated with commonly restored virtual machine versions) and current day incremental files or incremental files corresponding with snapshots captured within the past 24 hours.

An incremental file may comprise a forward incremental file or a reverse incremental file. A forward incremental file may include a set of data representing changes that have occurred since an earlier point-in-time snapshot of a virtual machine. To generate a snapshot of the virtual machine corresponding with a forward incremental file, the forward incremental file may be combined with an earlier point in time snapshot of the virtual machine (e.g., the forward incremental file may be combined with the last full image of the virtual machine that was captured before the forward incremental file was captured and any other forward incremental files that were captured subsequent to the last full image and prior to the forward incremental file). A reverse incremental file may include a set of data representing changes from a later point-in-time snapshot of a virtual machine. To generate a snapshot of the virtual machine corresponding with a reverse incremental file, the reverse incremental file may be combined with a later point-in-time snapshot of the virtual machine (e.g., the reverse incremental file may be combined with the most recent snapshot of the virtual machine and any other reverse incremental files that were captured prior to the most recent snapshot and subsequent to the reverse incremental file).

The storage appliance 300 may provide a user interface (e.g., a web-based interface or a graphical user interface) that displays virtual machine backup information such as identifications of the virtual machines protected and the historical versions or time machine views for each of the virtual machines protected. A time machine view of a virtual machine may include snapshots of the virtual machine over a plurality of points in time. Each snapshot may comprise the state of the virtual machine at a particular point in time. Each snapshot may correspond with a different version of the virtual machine (e.g., Version 1 of a virtual machine may correspond with the state of the virtual machine at a first point in time and Version 2 of the virtual machine may correspond with the state of the virtual machine at a second point in time subsequent to the first point in time).

The user interface may enable an end user of the storage appliance 300 (e.g., a system administrator or a virtualization administrator) to select a particular version of a virtual machine to be restored or mounted. When a particular version of a virtual machine has been mounted, the particular version may be accessed by a client (e.g., a virtual machine, a physical machine, or a computing device) as if the particular version was local to the client. A mounted version of a virtual machine may correspond with a mount point directory (e.g., /snapshots/VM5Nersion23). In one example, the storage appliance 300 may run a network file system (NFS) server and make the particular version (or a copy of the particular version) of the virtual machine accessible for reading and/or writing. The end user of the storage appliance 300 may then select the particular version to be mounted and run an application (e.g., a data analytics application) using the mounted version of the virtual machine. In another example, the particular version may be mounted as an iSCSI target.

Figure 2:
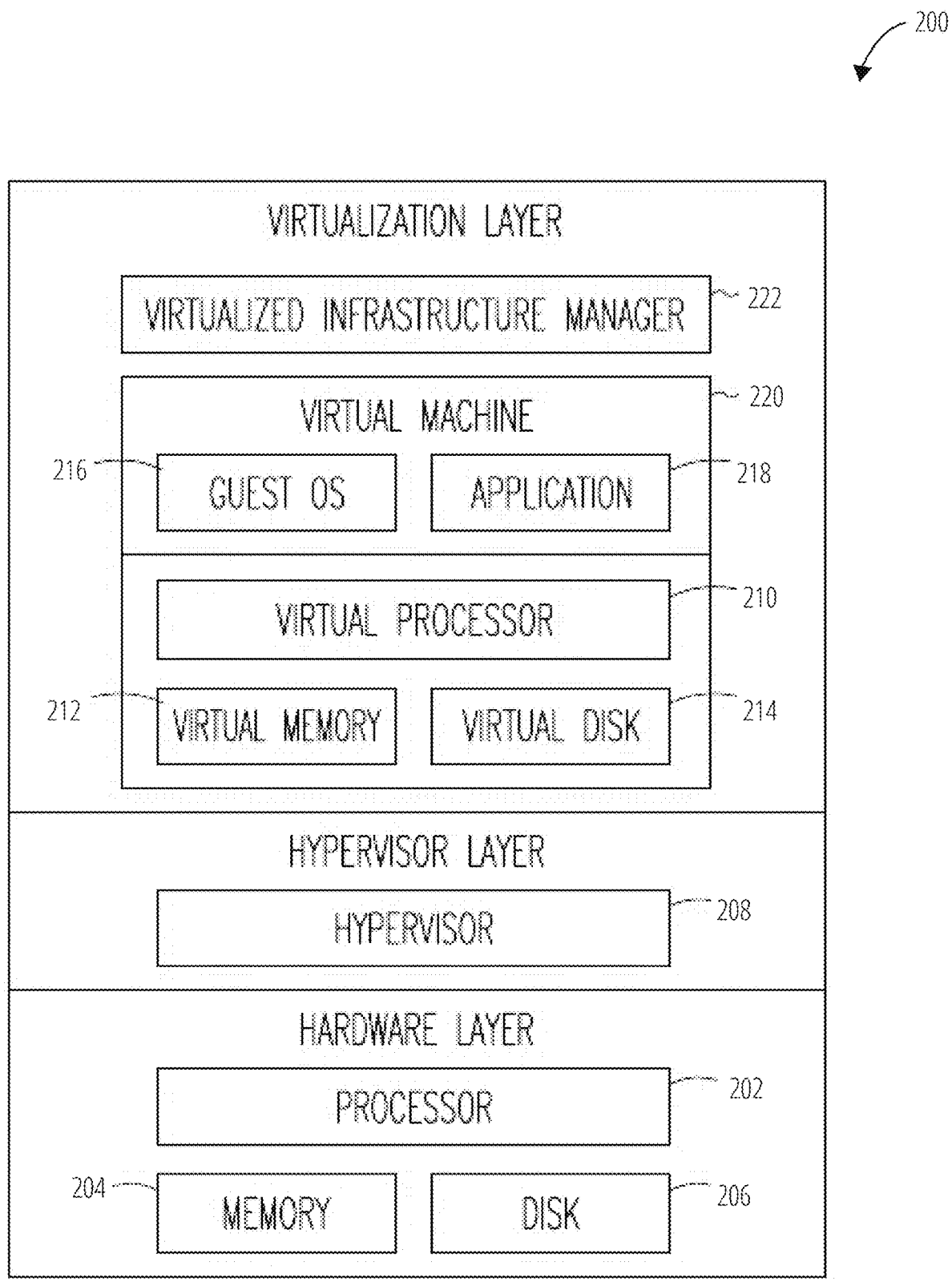
FIG. 2 depicts one embodiment of the server of FIG. 1, according to an example embodiment.

FIG. 2 depicts one embodiment of server 200 of FIG. 1. The server 200 may comprise one server out of a plurality of servers that are networked together within a data center (e.g., data center 106). In one example, the plurality of servers may be positioned within one or more server racks within the data center. As depicted, the server 200 includes hardware-level components and software-level components. The hardware-level components include one or more processors 202, one or more memory 204, and one or more disks 206. The software-level components include a hypervisor 208, a virtualized infrastructure manager 222, and one or more virtual machines, such as virtual machine 220. The hypervisor 208 may comprise a native hypervisor or a hosted hypervisor. The hypervisor 208 may provide a virtual operating platform for running one or more virtual machines, such as virtual machine 220. Virtual machine 220 includes a plurality of virtual hardware devices including a virtual processor 210, a virtual memory 212, and a virtual disk 214. The virtual disk 214 may comprise a file stored within the one or more disks 206. In one example, a virtual machine 220 may include a plurality of virtual disks 214, with each virtual disk of the plurality of virtual disks 214 associated with a different file stored on the one or more disks 206. Virtual machine 220 may include a guest operating system 216 that runs one or more applications, such as application 218.

The virtualized infrastructure manager 222, which may correspond with the virtualization manager 118 in FIG. 1, may run on a virtual machine or natively on the server 200. The virtual machine may, for example, be or include the virtual machine 220 or a virtual machine separate from the server 200. Other arrangements are possible. The virtualized infrastructure manager 222 may provide a centralized platform for managing a virtualized infrastructure that includes a plurality of virtual machines. The virtualized infrastructure manager 222 may manage the provisioning of virtual machines running within the virtualized infrastructure and provide an interface to computing devices interacting with the virtualized infrastructure. The virtualized infrastructure manager 222 may perform various virtualized infrastructure related tasks, such as cloning virtual machines, creating new virtual machines, monitoring the state of virtual machines, and facilitating backups of virtual machines.

In one embodiment, the server 200 may use the virtualized infrastructure manager 222 to facilitate backups for a plurality of virtual machines (e.g., eight different virtual machines) running on the server 200. Each virtual machine running on the server 200 may run its own guest operating system and its own set of applications. Each virtual machine running on the server 200 may store its own set of files using one or more virtual disks associated with the virtual machine (e.g., each virtual machine may include two virtual disks that are used for storing data associated with the virtual machine).

In one embodiment, a data management application running on a storage appliance, such as storage appliance 102 in FIG. 1 or storage appliance 300 in FIG. 1, may request a snapshot of a virtual machine running on server 200. The snapshot of the virtual machine may be stored as one or more files, with each file associated with a virtual disk of the virtual machine. A snapshot of a virtual machine may correspond with a state of the virtual machine at a particular point in time. The particular point in time may be associated with a time stamp. In one example, a first snapshot of a virtual machine may correspond with a first state of the virtual machine (including the state of applications and files stored on the virtual machine) at a first point in time and a second snapshot of the virtual machine may correspond with a second state of the virtual machine at a second point in time subsequent to the first point in time.

In response to a request for a snapshot of a virtual machine at a particular point in time, the virtualized infrastructure manager 222 may set the virtual machine into a frozen state or store a copy of the virtual machine at the particular point in time. The virtualized infrastructure manager 222 may then transfer data associated with the virtual machine (e.g., an image of the virtual machine or a portion of the image of the virtual machine) to the storage appliance 300 or storage appliance 102. The data associated with the virtual machine may include a set of files including a virtual disk file storing contents of a virtual disk of the virtual machine at the particular point in time and a virtual machine configuration file storing configuration settings for the virtual machine at the particular point in time. The contents of the virtual disk file may include the operating system used by the virtual machine, local applications stored on the virtual disk, and user files (e.g., images and word processing documents). In some cases, the virtualized infrastructure manager 222 may transfer a full image of the virtual machine to the storage appliance 102 or storage appliance 300 of FIG. 1 or a plurality of data blocks corresponding with the full image (e.g., to enable a full image-level backup of the virtual machine to be stored on the storage appliance). In other cases, the virtualized infrastructure manager 222 may transfer a portion of an image of the virtual machine associated with data that has changed since an earlier point in time prior to the particular point in time or since a last snapshot of the virtual machine was taken. In one example, the virtualized infrastructure manager 222 may transfer only data associated with virtual blocks stored on a virtual disk of the virtual machine that have changed since the last snapshot of the virtual machine was taken. In one embodiment, the data management application may specify a first point in time and a second point in time and the virtualized infrastructure manager 222 may output one or more virtual data blocks associated with the virtual machine that have been modified between the first point in time and the second point in time.

In some embodiments, the server 200 or the hypervisor 208 may communicate with a storage appliance, such as storage appliance 102 in FIG. 1 or storage appliance 300 in FIG. 1, using a distributed file system protocol such an NFS Version 3, or Server Message Block (SMB) protocol. The distributed file system protocol may allow the server 200 or the hypervisor 208 to access, read, write, or modify files stored on the storage appliance as if the files were locally stored on the server 200. The distributed file system protocol may allow the server 200 or the hypervisor 208 to mount a directory or a portion of a file system located within the storage appliance.

Figure 3:
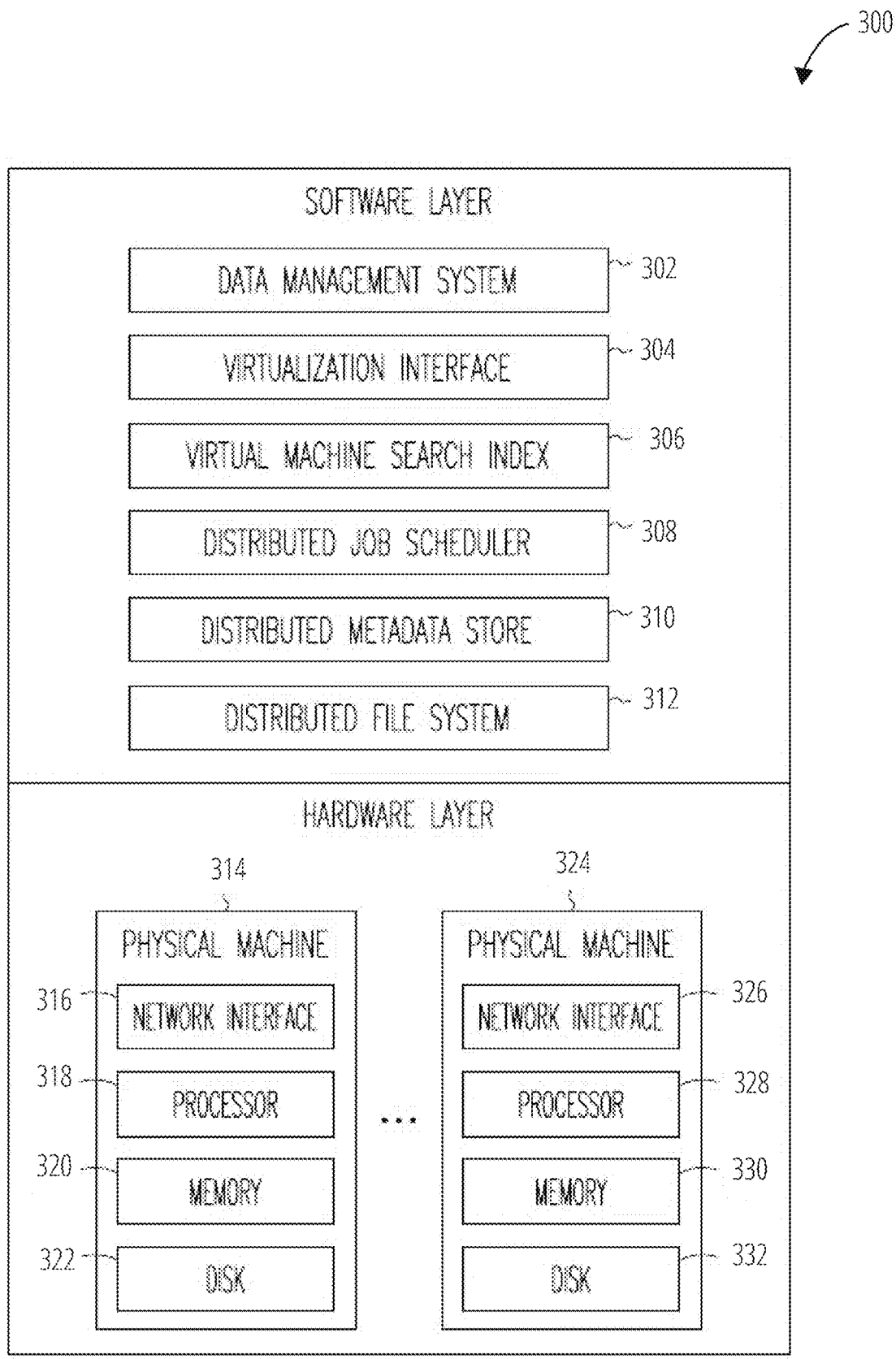
FIG. 3 depicts one embodiment of the storage appliance of FIG. 1, according to an example embodiment.

FIG. 3 depicts one embodiment of storage appliance 300 in FIG. 1. The storage appliance may include a plurality of physical machines that may be grouped together and presented as a single computing system. Each physical machine of the plurality of physical machines may comprise a node in a cluster (e.g., a failover cluster). In one example, the storage appliance may be positioned within a server rack within a data center. As depicted, the storage appliance 300 includes hardware-level components and software-level components. The hardware-level components include one or more physical machines, such as physical machine 314 and physical machine 324. The physical machine 314 includes a network interface 316, processor 318, memory 320, and disk 322 all in communication with each other. Processor 318 allows physical machine 314 to execute computer readable instructions stored in memory 320 to perform processes described herein. Disk 322 may include a hard disk drive and/or a solid-state drive. The physical machine 324 includes a network interface 326, processor 328, memory 330, and disk 332 all in communication with each other. Processor 328 allows physical machine 324 to execute computer readable instructions stored in memory 330 to perform processes described herein. Disk 332 may include a hard disk drive and/or a solid-state drive. In some cases, disk 332 may include a flash-based SSD or a hybrid HDD/SSD drive. In one embodiment, the storage appliance 300 may include a plurality of physical machines arranged in a cluster (e.g., eight machines in a cluster). Each of the plurality of physical machines may include a plurality of multi-core CPUs, 108 GB of RAM, a 500 GB SSD, four 4 TB HDDs, and a network interface controller.

In some embodiments, the plurality of physical machines may be used to implement a cluster-based network file-server. The cluster-based network file server may neither require nor use a front-end load balancer. One issue with using a front-end load balancer to host the internet protocol (IP) address for the cluster-based network file server and to forward requests to the nodes of the cluster-based network file server is that the front-end load balancer comprises a single point of failure for the cluster-based network file server. In some cases, the file system protocol used by a server, such as server 200 in FIG. 1, or a hypervisor, such as hypervisor 208 in FIG. 2, to communicate with the storage appliance 300 may not provide a failover mechanism (e.g., NFS Version 3). In the case that no failover mechanism is provided on the client side, the hypervisor may not be able to connect to a new node within a cluster in the event that the node connected to the hypervisor fails.

In some embodiments, each node in a cluster may be connected to each other via a network and may be associated with one or more IP addresses (e.g., two different IP addresses may be assigned to each node). In one example, each node in the cluster may be assigned a permanent IP address and a floating IP address and may be accessed using either the permanent IP address or the floating IP address. In this case, a hypervisor, such as hypervisor 208 in FIG. 2, may be configured with a first floating IP address associated with a first node in the cluster. The hypervisor may connect to the cluster using the first floating IP address. In one example, the hypervisor may communicate with the cluster using the NFS Version 3 protocol. Each node in the cluster may run a Virtual Router Redundancy Protocol (VRRP) daemon. A daemon may comprise a background process. Each VRRP daemon may include a list of all floating IP addresses available within the cluster. In the event that the first node associated with the first floating IP address fails, one of the VRRP daemons may automatically assume or pick up the first floating IP address if no other VRRP daemon has already assumed the first floating IP address. Therefore, if the first node in the cluster fails or otherwise goes down, then one of the remaining VRRP daemons running on the other nodes in the cluster may assume the first floating IP address that is used by the hypervisor for communicating with the cluster.

In order to determine which of the other nodes in the cluster will assume the first floating IP address, a VRRP priority may be established. In one example, given a number (N) of nodes in a cluster from node(0) to node(N−1), for a floating IP address (i), the VRRP priority of nodeG may be G-i modulo N. In another example, given a number (N) of nodes in a cluster from node(0) to node(N−1), for a floating IP address (i), the VRRP priority of nodeG may be (i-j) modulo N. In these cases, nodeG will assume floating IP address (i) only if its VRRP priority is higher than that of any other node in the cluster that is alive and announcing itself on the network. Thus, if a node fails, then there may be a clear priority ordering for determining which other node in the cluster will take over the failed node's floating IP address.

In some cases, a cluster may include a plurality of nodes and each node of the plurality of nodes may be assigned a different floating IP address. In this case, a first hypervisor may be configured with a first floating IP address associated with a first node in the cluster, a second hypervisor may be configured with a second floating IP address associated with a second node in the cluster, and a third hypervisor may be configured with a third floating IP address associated with a third node in the cluster.

As depicted in FIG. 3, the software-level components of the storage appliance 300 may include data management system 302, a virtualization interface 304, a distributed job scheduler 308, a distributed metadata store 310, a distributed file system 312, and one or more virtual machine search indexes, such as virtual machine search index 306. In one embodiment, the software-level components of the storage appliance 300 may be run using a dedicated hardware-based appliance. In another embodiment, the software-level components of the storage appliance 300 may be run from the cloud (e.g., the software-level components may be installed on a cloud service provider).

In some cases, the data storage across a plurality of nodes in a cluster (e.g., the data storage available from the one or more physical machine (e.g., physical machine 314 and physical machine 324)) may be aggregated and made available over a single file system namespace (e.g., /snapshots/). A directory for each virtual machine protected using the storage appliance 300 may be created (e.g., the directory for Virtual Machine A may be /snapshots/VM_A). Snapshots and other data associated with a virtual machine may reside within the directory for the virtual machine. In one example, snapshots of a virtual machine may be stored in subdirectories of the directory (e.g., a first snapshot of Virtual Machine A may reside in/snapshots/VM_A/s1/ and a second snapshot of Virtual Machine A may reside in /snapshots/VM_A/s2/).

The distributed file system 312 may present itself as a single file system, in which as new physical machines or nodes are added to the storage appliance 300, the cluster may automatically discover the additional nodes and automatically increase the available capacity of the file system for storing files and other data. Each file stored in the distributed file system 312 may be partitioned into one or more chunks or shards. Each of the one or more chunks may be stored within the distributed file system 312 as a separate file. The files stored within the distributed file system 312 may be replicated or mirrored over a plurality of physical machines, thereby creating a load-balanced and fault tolerant distributed file system. In one example, storage appliance 300 may include ten physical machines arranged as a failover cluster and a first file corresponding with a snapshot of a virtual machine (e.g., /snapshots/VM_A/s1/s1.full) may be replicated and stored on three of the ten machines.

The distributed metadata store 310 may include a distributed database management system that provides high availability without a single point of failure. In one embodiment, the distributed metadata store 310 may comprise a database, such as a distributed document-oriented database. The distributed metadata store 310 may be used as a distributed key value storage system. In one example, the distributed metadata store 310 may comprise a distributed NoSQL key value store database. In some cases, the distributed metadata store 310 may include a partitioned row store, in which rows are organized into tables or other collections of related data held within a structured format within the key value store database. A table (or a set of tables) may be used to store metadata information associated with one or more files stored within the distributed file system 312. The metadata information may include the name of a file, a size of the file, file permissions associated with the file, when the file was last modified, and file mapping information associated with an identification of the location of the file stored within a cluster of physical machines. In one embodiment, a new file corresponding with a snapshot of a virtual machine may be stored within the distributed file system 312 and metadata associated with the new file may be stored within the distributed metadata store 310. The distributed metadata store 310 may also be used to store a backup schedule for the virtual machine and a list of snapshots for the virtual machine that are stored using the storage appliance 300.

In some cases, the distributed metadata store 310 may be used to manage one or more versions of a virtual machine. Each version of the virtual machine may correspond with a full image snapshot of the virtual machine stored within the distributed file system 312 or an incremental snapshot of the virtual machine (e.g., a forward incremental or reverse incremental) stored within the distributed file system 312. In one embodiment, the one or more versions of the virtual machine may correspond with a plurality of files. The plurality of files may include a single full image snapshot of the virtual machine and one or more incremental aspects derived from the single full image snapshot. The single full image snapshot of the virtual machine may be stored using a first storage device of a first type (e.g., a HDD) and the one or more incremental aspects derived from the single full image snapshot may be stored using a second storage device of a second type (e.g., an SSD). In this case, only a single full image needs to be stored and each version of the virtual machine may be generated from the single full image or the single full image combined with a subset of the one or more incremental aspects. Furthermore, each version of the virtual machine may be generated by performing a sequential read from the first storage device (e.g., reading a single file from a HDD) to acquire the full image and, in parallel, performing one or more reads from the second storage device (e.g., performing fast random reads from an SSD) to acquire the one or more incremental aspects.

The distributed job scheduler 308 may be used for scheduling backup jobs that acquire and store virtual machine snapshots for one or more virtual machines over time. The distributed job scheduler 308 may follow a backup schedule to back up an entire image of a virtual machine at a particular point in time or one or more virtual disks associated with the virtual machine at the particular point in time. In one example, the backup schedule may specify that the virtual machine be backed up at a snapshot capture frequency, such as every two hours or every 24 hours. Each backup job may be associated with one or more tasks to be performed in a sequence. Each of the one or more tasks associated with a job may be run on a particular node within a cluster. In some cases, the distributed job scheduler 308 may schedule a specific job to be run on a particular node based on data stored on the particular node. For example, the distributed job scheduler 308 may schedule a virtual machine snapshot job to be run on a node in a cluster that is used to store snapshots of the virtual machine in order to reduce network congestion.

The distributed job scheduler 308 may comprise a distributed fault tolerant job scheduler, in which jobs affected by node failures are recovered and rescheduled to be run on available nodes. In one embodiment, the distributed job scheduler 308 may be fully decentralized and implemented without the existence of a master node. The distributed job scheduler 308 may run job scheduling processes on each node in a cluster or on a plurality of nodes in the cluster. In one example, the distributed job scheduler 308 may run a first set of job scheduling processes on a first node in the cluster, a second set of job scheduling processes on a second node in the cluster, and a third set of job scheduling processes on a third node in the cluster. The first set of job scheduling processes, the second set of job scheduling processes, and the third set of job scheduling processes may store information regarding jobs, schedules, and the states of jobs using a metadata store, such as distributed metadata store 310. In the event that the first node running the first set of job scheduling processes fails (e.g., due to a network failure or a physical machine failure), the states of the jobs managed by the first set of job scheduling processes may fail to be updated within a threshold period of time (e.g., a job may fail to be completed within 30 seconds or within minutes from being started). In response to detecting jobs that have failed to be updated within the threshold period of time, the distributed job scheduler 308 may undo and restart the failed jobs on available nodes within the cluster.

The job scheduling processes running on at least a plurality of nodes in a cluster (e.g., on each available node in the cluster) may manage the scheduling and execution of a plurality of jobs. The job scheduling processes may include run processes for running jobs, cleanup processes for cleaning up failed tasks, and rollback processes for rolling-back or undoing any actions or tasks performed by failed jobs. In one embodiment, the job scheduling processes may detect that a particular task for a particular job has failed and in response may perform a cleanup process to clean up or remove the effects of the particular task and then perform a rollback process that processes one or more completed tasks for the particular job in reverse order to undo the effects of the one or more completed tasks. Once the particular job with the failed task has been undone, the job scheduling processes may restart the particular job on an available node in the cluster.

The distributed job scheduler 308 may manage a job in which a series of tasks associated with the job are to be performed atomically (i.e., partial execution of the series of tasks is not permitted). If the series of tasks cannot be completely executed or there is any failure that occurs to one of the series of tasks during execution (e.g., a hard disk associated with a physical machine fails or a network connection to the physical machine fails), then the state of a data management system may be returned to a state as if none of the series of tasks was ever performed. The series of tasks may correspond with an ordering of tasks for the series of tasks and the distributed job scheduler 308 may ensure that each task of the series of tasks is executed based on the ordering of tasks. Tasks that do not have dependencies with each other may be executed in parallel.

In some cases, the distributed job scheduler 308 may schedule each task of a series of tasks to be performed on a specific node in a cluster. In other cases, the distributed job scheduler 308 may schedule a first task of the series of tasks to be performed on a first node in a cluster and a second task of the series of tasks to be performed on a second node in the cluster. In these cases, the first task may have to operate on a first set of data (e.g., a first file stored in a file system) stored on the first node and the second task may have to operate on a second set of data (e.g., metadata related to the first file that is stored in a database) stored on the second node. In some embodiments, one or more tasks associated with a job may have an affinity to a specific node in a cluster.

In one example, if the one or more tasks require access to a database that has been replicated on three nodes in a cluster, then the one or more tasks may be executed on one of the three nodes. In another example, if the one or more tasks require access to multiple chunks of data associated with a virtual disk that has been replicated over four nodes in a cluster, then the one or more tasks may be executed on one of the four nodes. Thus, the distributed job scheduler 308 may assign one or more tasks associated with a job to be executed on a particular node in a cluster based on the location of data required to be accessed by the one or more tasks.

In one embodiment, the distributed job scheduler 308 may manage a first job associated with capturing and storing a snapshot of a virtual machine periodically (e.g., every 30 minutes). The first job may include one or more tasks, such as communicating with a virtualized infrastructure manager, such as the virtualized infrastructure manager 222 in FIG. 2, to create a frozen copy of the virtual machine and to transfer one or more chunks (or one or more files) associated with the frozen copy to a storage appliance, such as storage appliance 300 in FIG. 1. The one or more tasks may also include generating metadata for the one or more chunks, storing the metadata using the distributed metadata store 310, storing the one or more chunks within the distributed file system 312, and communicating with the virtualized infrastructure manager 222 that the frozen copy of the virtual machine may be unfrozen or released from a frozen state. The metadata for a first chunk of the one or more chunks may include information specifying a version of the virtual machine associated with the frozen copy, a time associated with the version (e.g., the snapshot of the virtual machine was taken at 5:30 p.m. on Jun. 29, 2018), and a file path to where the first chunk is stored within the distributed file system 92 (e.g., the first chunk is located at/snapshotsNM_B/s1/s1.chunk1). The one or more tasks may also include deduplication, compression (e.g., using a lossless data compression algorithm such as LZ4 or LZ77), decompression, encryption (e.g., using a symmetric key algorithm such as Triple Data Encryption Algorithm (DES) or Advanced Encryption Standard (AES)-256), and decryption related tasks.

The virtualization interface 304 may provide an interface for communicating with a virtualized infrastructure manager managing a virtualization infrastructure, such as virtualized infrastructure manager 222 in FIG. 2, and requesting data associated with virtual machine snapshots from the virtualization infrastructure. The virtualization interface 304 may communicate with the virtualized infrastructure manager using an Application Programming Interface (API) for accessing the virtualized infrastructure manager (e.g., to communicate a request for a snapshot of a virtual machine). In this case, storage appliance 300 may request and receive data from a virtualized infrastructure without requiring agent software to be installed or running on virtual machines within the virtualized infrastructure. The virtualization interface 304 may request data associated with virtual blocks stored on a virtual disk of the virtual machine that have changed since a last snapshot of the virtual machine was taken or since a specified prior point in time. Therefore, in some cases, if a snapshot of a virtual machine is the first snapshot taken of the virtual machine, then a full image of the virtual machine may be transferred to the storage appliance. However, if the snapshot of the virtual machine is not the first snapshot taken of the virtual machine, then only the data blocks of the virtual machine that have changed since a prior snapshot was taken may be transferred to the storage appliance.

The virtual machine search index 306 may include a list of files that have been stored using a virtual machine and a version history for each of the files in the list. Each version of a file may be mapped to the earliest point-in-time snapshot of the virtual machine that includes the version of the file or to a snapshot of the virtual machine that includes the version of the file (e.g., the latest point in time snapshot of the virtual machine that includes the version of the file). In one example, the virtual machine search index 306 may be used to identify a version of the virtual machine that includes a particular version of a file (e.g., a particular version of a database, a spreadsheet, or a word processing document). In some cases, each of the virtual machines that are backed up or protected using storage appliance 300 may have a corresponding virtual machine search index.

In one embodiment, as each snapshot of a virtual machine is ingested, each virtual disk associated with the virtual machine is parsed in order to identify a file system type associated with the virtual disk and to extract metadata (e.g., file system metadata) for each file stored on the virtual disk. The metadata may include information for locating and retrieving each file from the virtual disk. The metadata may also include a name of a file, the size of the file, the last time at which the file was modified, and a content checksum for the file. Each file that has been added, deleted, or modified since a previous snapshot was captured may be determined using the metadata (e.g., by comparing the time at which a file was last modified with a time associated with the previous snapshot). Thus, for every file that has existed within any of the snapshots of the virtual machine, a virtual machine search index may be used to identify when the file was first created (e.g., corresponding with a first version of the file) and at what times the file was modified (e.g., corresponding with subsequent versions of the file). Each version of the file may be mapped to a particular version of the virtual machine that stores that version of the file.

In some cases, if a virtual machine includes a plurality of virtual disks, then a virtual machine search index may be generated for each virtual disk of the plurality of virtual disks. For example, a first virtual machine search index may catalog and map files located on a first virtual disk of the plurality of virtual disks and a second virtual machine search index may catalog and map files located on a second virtual disk of the plurality of virtual disks. In this case, a global file catalog or a global virtual machine search index for the virtual machine may include the first virtual machine search index and the second virtual machine search index. A global file catalog may be stored for each virtual machine backed up by a storage appliance within a file system, such as distributed file system 312 in FIG. 3.

The data management system 302 may comprise an application running on the storage appliance 300 that manages and stores one or more snapshots of a virtual machine. In one example, the data management system 302 may comprise a highest-level layer in an integrated software stack running on the storage appliance. The integrated software stack may include the data management system 302, the virtualization interface 304, the distributed job scheduler 308, the distributed metadata store 310, and the distributed file system 312.

In some cases, the integrated software stack may run on other computing devices, such as a server or computing device 108 in FIG. 1. The data management system 302 may use the virtualization interface 304, the distributed job scheduler 308, the distributed metadata store 310, and the distributed file system 312 to manage and store one or more snapshots of a virtual machine. Each snapshot of the virtual machine may correspond with a point-in-time version of the virtual machine. The data management system 302 may generate and manage a list of versions for the virtual machine. Each version of the virtual machine may map to or reference one or more chunks and/or one or more files stored within the distributed file system 312. Combined together, the one or more chunks and/or the one or more files stored within the distributed file system 312 may comprise a full image of the version of the virtual machine.

Figure 4:
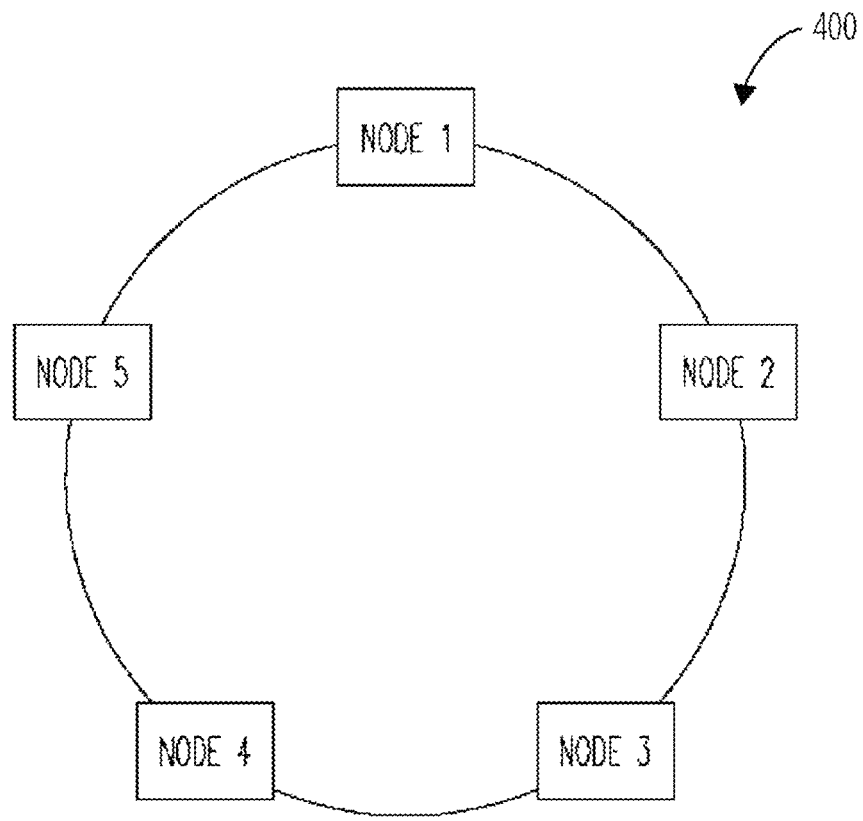
FIG. 4 shows an example cluster of a distributed decentralized database, according to some example embodiments.

FIG. 4 shows an example cluster 400 of a distributed decentralized database, according to some example embodiments. As illustrated, the example cluster 400 includes five nodes, nodes 1-5. In some example embodiments, each of the five nodes runs from different machines, such as physical machine 314 in FIG. 3 or virtual machine 220 in FIG. 2. The nodes in the example cluster 400 can include instances of peer nodes of a distributed database (e.g., cluster-based database, distributed decentralized database management system, a NoSQL database, Apache Cassandra, DataStax, MongoDB, CouchDB), according to some example embodiments. The distributed database system is distributed in that data is sharded or distributed across the example cluster 400 in shards or chunks and decentralized in that there is no central storage device and no single point of failure. The system operates under an assumption that multiple nodes may go down, up, or become non-responsive, and so on. Sharding is splitting up of the data horizontally and managing each shard separately on different nodes. For example, if the data managed by the example cluster 400 can be indexed using the 26 letters of the alphabet, node 1 can manage a first shard that handles records that start with A through E, node 2 can manage a second shard that handles records that start with F through J, and so on.

In some example embodiments, data written to one of the nodes is replicated to one or more other nodes per a replication protocol of the example cluster 400. For example, data written to node 1 can be replicated to nodes 2 and 3. If node 1 prematurely terminates, node 2 and/or 3 can be used to provide the replicated data. In some example embodiments, each node of example cluster 400 frequently exchanges state information about itself and other nodes across the example cluster 400 using gossip protocol. Gossip protocol is a peer-to-peer communication protocol in which each node randomly shares (e.g., communicates, requests, transmits) location and state information about the other nodes in a given cluster.

Writing: For a given node, a sequentially written commit log captures the write activity to ensure data durability. The data is then written to an in-memory structure (e.g., a memtable, write-back cache). Each time the in-memory structure is full, the data is written to disk in a Sorted String Table data file. In some example embodiments, writes are automatically partitioned and replicated throughout the example cluster 400.

Reading: Any node of example cluster 400 can receive a read request (e.g., query) from an external client. If the node that receives the read request manages the data requested, the node provides the requested data. If the node does not manage the data, the node determines which node manages the requested data. The node that received the read request then acts as a proxy between the requesting entity and the node that manages the data (e.g., the node that manages the data sends the data to the proxy node, which then provides the data to an external entity that generated the request).

The distributed decentralized database system is decentralized in that there is no single point of failure due to the nodes being symmetrical and seamlessly replaceable. For example, whereas conventional distributed data implementations have nodes with different functions (e.g., master/slave nodes, asymmetrical database nodes, federated databases), the nodes of example cluster 400 are configured to function the same way (e.g., as symmetrical peer database nodes that communicate via gossip protocol, such as Cassandra nodes) with no single point of failure. If one of the nodes in example cluster 400 terminates prematurely ("goes down"), another node can rapidly take the place of the terminated node without disrupting service. The example cluster 400 can be a container for a keyspace, which is a container for data in the distributed decentralized database system (e.g., whereas a database is a container for containers in conventional relational databases, the Cassandra keyspace is a container for a Cassandra database system).

Some examples provide observability for operational activity (including telemetric data) of all nodes in the example cluster 400, and/or in a group of example cluster 400, and/or in the cloud. The telemetry generated may exist in various forms such as metrics, logs, traces, and structured product data. Some examples herein focus on the collection and observability of metrics data. A significant challenge arising in conventional systems can be an inability to provide full observability for all metrics collected. For examples, metrics may be collected at about 70 kilobytes (kb) per node but rendered visible at only 1 kb per node. In other words, 98.6% of metrics are dropped leading to a gap in visibility. In other examples, metrics may be collected at a minute granularity, but aggregated over 10 minutes, for example. Here, 90% of reported data is lost. In other examples, metrics data may be ephemeral. In order to identify a cause of failure, most issue investigations need to drill down to a specific job or snapshot id or mailbox. However, this set of data can become extremely large and break in-memory indexes. If this occurs, there is no support for low level metrics on a node or in the cloud. In other examples, from a data points per minute (DPM) reporting perspective, 99.85% of metrics data may be lost. In order to collect all metric data and render it visible while keeping operational budgets constant, examples may reduce costs significantly. A primary roadblock to supporting full data is cost which is directly related to DPM and a number of time series (cardinality). Thus, some examples herein recognize a business need for lots of metrics and a desire to pay less for this, while deriving and supporting rich tags in a tag-based schema. In some examples, cost savings are achieving by using application-aware compression of metrics; in some examples at their source (through a library for example) and, if not in the cloud, by using sparseness estimators In some examples of an anomaly database in telemetry systems and applications, the scale and cost of the database are drive by two important measures: DPM (data points generated per minute) and a cardinality of series (relating to the metadata associated with data that needs to be indexed for powering read queries). In this specification, an anomaly database may also be referred to as a time series data bases (TSDB), or an anomaly database system 1402 (FIG. 14), or a component thereof depending on the context in which this element is described. In other words, handling large time series datasets incurs two key challenges: (a) a data storage problem, i.e. how to store so much data cost effectively, and (b) an indexing problem, i.e. how to index so many series cost effectively. In seeking to meet significant cost-cutting goals, some examples reduce DPM by an order of magnitude. To that end, some examples employ "sparse data. In a general sense, some examples identify "normal looking" data and compress this to save billions of metrics and storage space. "Abnormal-looking" data is examined, but such data may be harder to detect.

A data problem that the sparse data seeks to address can arise when a time series (under a service level agreement (SLA) for example) is required to be reported by a database at a fixed interval regardless of whether the relevant value is changing or not. For example, if a service consistently uses 1 megabyte (MB) of RAM and reports memory used every 1 minute, it may post the same data point, just with a newer epoch [1] [2] (cardinality). Some databases may allow a user to configure a reporting interval, however if a user chooses a large interval precision is lost, and if the user chooses a small interval then cost increases. Thus, some sparse data examples dynamically tune this interval [3] [4] [5] algorithmically on a per data point level to optimize for lowest cost while maximizing data fidelity. In other words, data points that do not contribute any significant information beyond what is already known are dropped.

Figure 5:
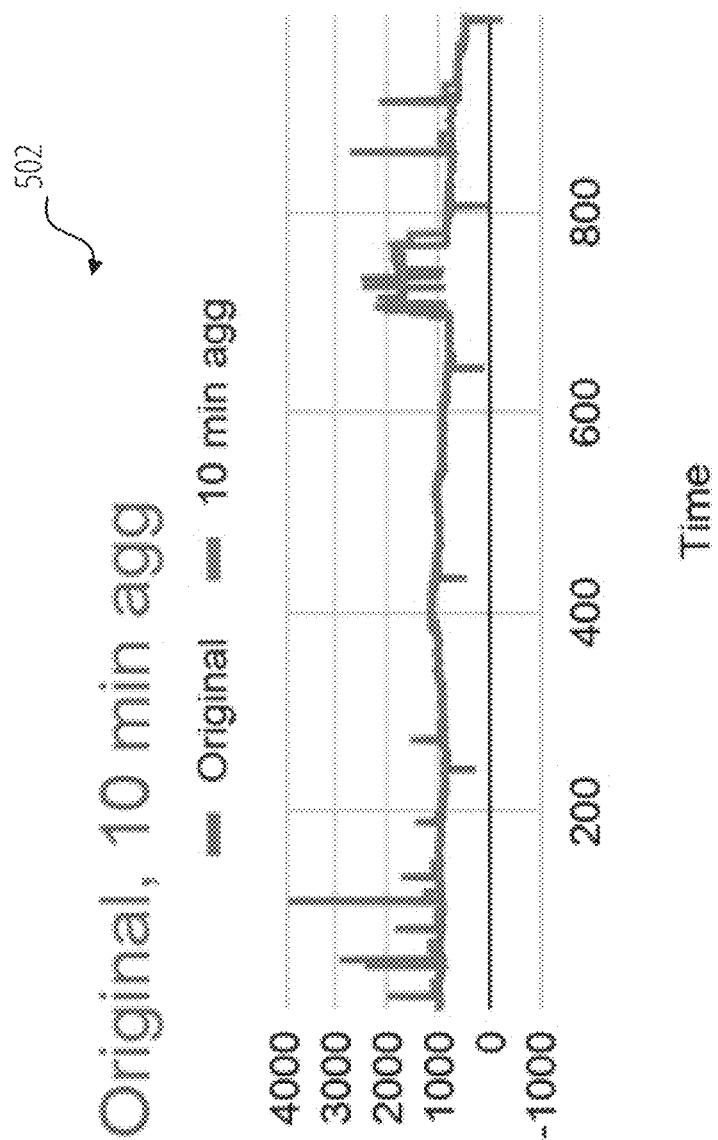
FIG. 5 illustrates an aspect of the subject matter in accordance with one embodiment.

To illustrate, with reference to the graph 502 of FIG. 5, assume an example time series (synthetically generated using a random walk) is generated at 1 minute interval. This reflects the data generation from a continuous data management (CDM) node (for example, in an example cluster 400). On the cloud this series may be aggregated to a 10 minute interval to reduce the data points (cost perspective). As is evident, significant information may be lost as part of this aggregation.

Figure 6:
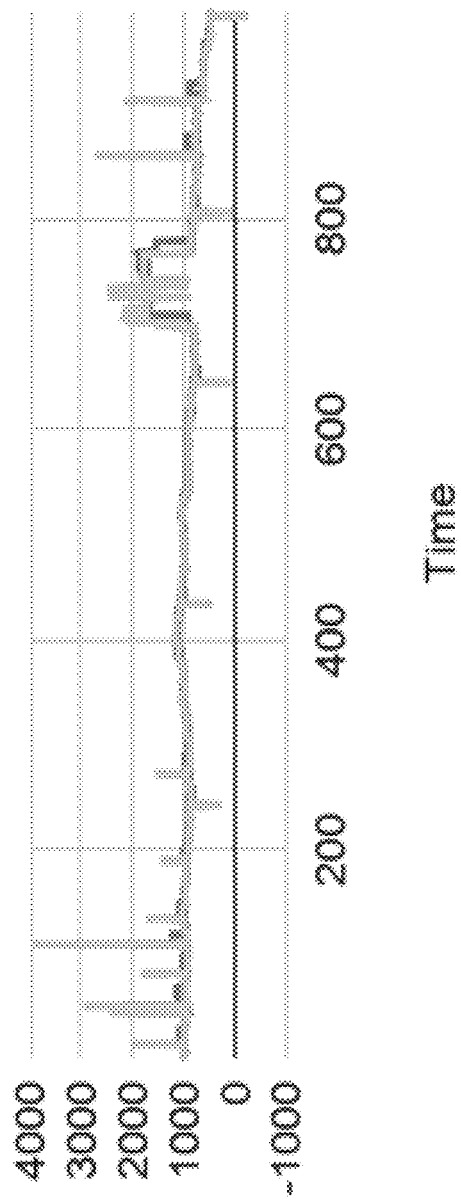
FIG. 6 illustrates an aspect of the subject matter in accordance with one embodiment.

With reference to the graph 602 of FIG. 6, a sparseness algorithm (based on a last value delta) the illustrated series will be generated. It will be noted that the sparseness approach more accurately captures the significant variations compared to the fixed interval aggregation.

Figure 7:
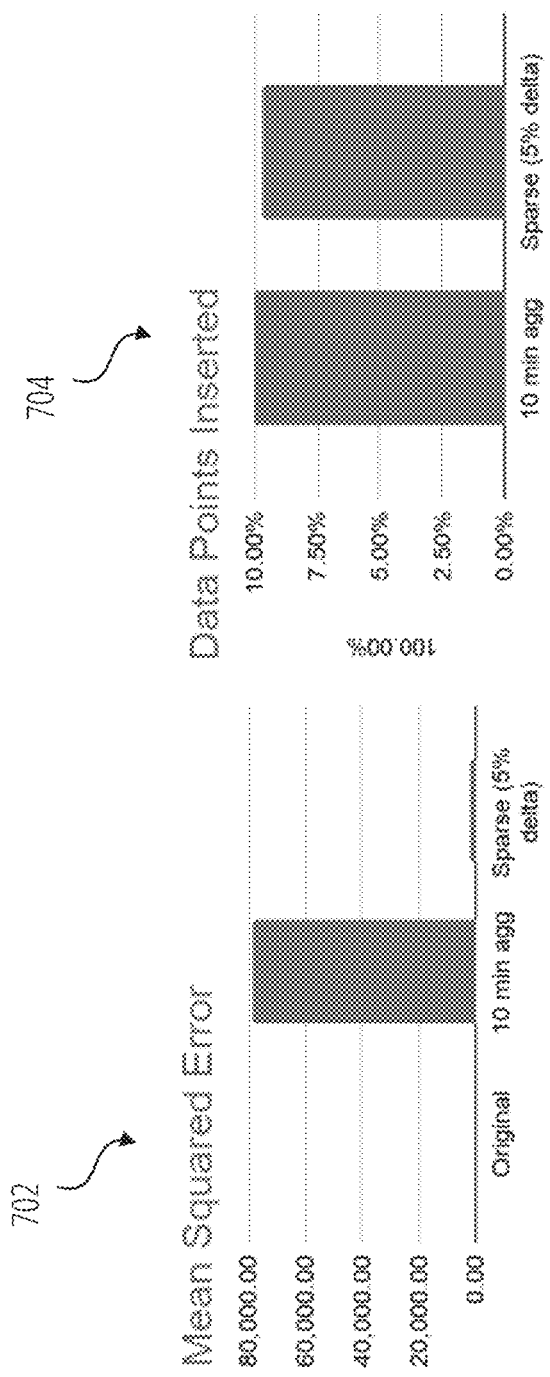
FIG. 7 illustrates an aspect of the subject matter in accordance with one embodiment.

With reference to FIG. 7, the chart 702 and chart 704 show a mean squared error (MSE) for the original and sparse estimators of FIG. 5 and FIG. 6 and a reduction in data points (e.g., DPM) achieved. For such a series, the sparseness algorithm delivers a similar reduction in data points but at a far higher accuracy.

Figure 8:
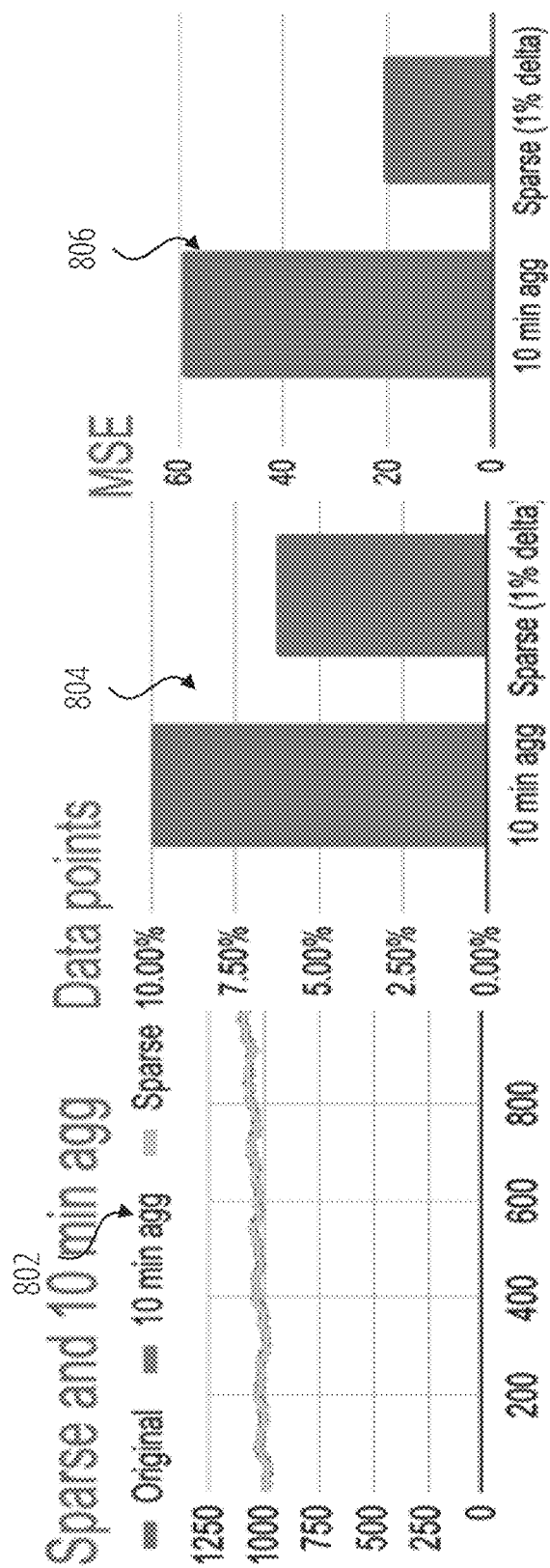
FIG. 8 illustrates an aspect of the subject matter in accordance with one embodiment.

With reference to FIG. 8, the graph 802 represents a further example time series (synthetically generated using a random walk) generated at 1 minute intervals. Here, a much lower variance between the results of the original and sparseness approaches may be observed. There are very few outliers. A visual comparison of the respective MSEs in chart 806 and the DPM results shown in chart 804 indicate that data fidelity was preserved (i.e. lower MSE values) while yielding an improved reduction in the level of data points used.

Figure 9:
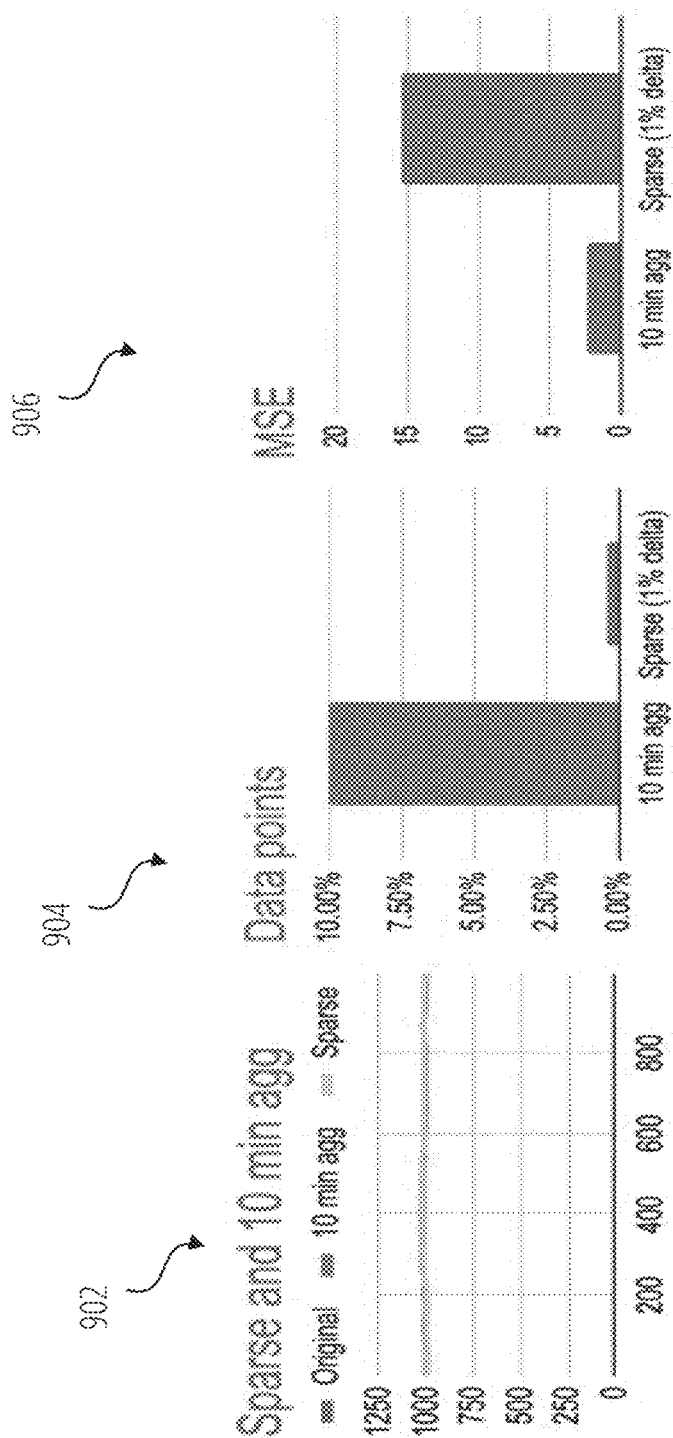
FIG. 9 illustrates an aspect of the subject matter in accordance with one embodiment.

A more extreme case is shown in the graph 902 of FIG. 9 in which there is very little variance, and in which the example yields the greatest effect by using sparse algorithms to preserve data fidelity in terms of reduction of data volume. Significant improvement in both aspects are achieved as shown in chart 904 and chart 906. Such low variance series are common in ephemeral or high dimensional data sets.

As mentioned above, most metric data is generated at 1 min granularity, but fidelity can be lost through aggregation at 10 minutes. For some example system counters, the aggregation step is no different than the sparseness algorithm proposed. In a 10 minute interval the first 9 points may be dropped with only the last point let through. In sparseness examples, significant increments in count can pass through and this may happen every minute or only twice a day, for example. So, some sparseness examples can provide better fidelity when the system counter is changing rapidly.

Some examples have an impact of transformations. Mathematically speaking sparseness introduces an error ($\in$) in the value at time t. Assume for a particular metric (M) we receive a value mt0 at time t0 and mt1 at time t1. A sparseness algorithm (see below for examples) analyzes the value mt1 received at t1 and may drop if the change is not significant. In other words, an estimate of value at time t1 is mt0+$\in$, where the assumption is $\in$ is capped depending on the sparse algorithm and its configuration. When the value is directly visualized the assumption is ∈ error introduced is insignificant and does not impact an ability to troubleshoot or detect problems. However if this value is not directly visualized, but another transformation (f( ) has to be applied then unexpected behavior may arise and be detectable since the value visualized is not mt0+∈ but f(mt0+∈)=f(mt0)+E. In this case the error introduced can be arbitrary and may not be tolerable.

As an illustration if f( ) is antilog the E can be extremely large. Another example is if M is a counter and f is derivative or f( ) can be a difference between two counters.[1] [2] [3]. As a general rule, some examples exclude all metrics that are transformed before visualizing from sparseness algorithms. However this may exclude a vast chunk of potentially available metrics. Instead of excluding this, some examples work on providing these transformations as part of a write path, so examples only write the transformed value (end user consumable), and this can be safely converted to a sparse form.

In some examples, the transformations may be applied to counter types, mainly because a counter by itself may be hard to interpret and only carries value when transformed through a derivative to compute the rate of change or as a difference between counters to estimate queue lengths. Such transformations are generally of relatively low cost and convenient to perform at write time. Example transformations may include a diff series transformation in which counters are used to compute a queue length using DIFF-SERIES. Another example includes a derivative transformation example in which a non-negative-derivative is more stable with lower variance between nodes.

Some sparseness examples are configured for types of metric data. For example, a gauge is an instantaneous measurement of a value. For example, a CPU utilization. Many gauges (type of metric data) are sampled at a certain frequency (e.g. CPU utilization is captured every minute), and thus can conveniently be the subject of a sparseness algorithm without losing critical info.

In another example metric type, almost all counters are monotonically increasing counters. One sparseness example may seek a more efficient way of measuring a pending job in a queue. Here, a sparseness algorithm is not applied directly on counter values, but instead performs a pre-transformation. For example, a sparseness algorithm may be applied after transforming the counter through a derivative (convert it to a meter essentially) or any other write time transformations possible. For the counters that remain, examples either leave them untouched or apply a derivative based sparseness check.

In another example metric type, a meter measures the rate of events over time (e.g., "requests per second"). In addition to the mean rate, meters also track 1-, 5-, and 15-minute moving averages. Sparseness examples may only preserve the lowest granularity rate and drop the higher granularity rates since they can be estimated from the lower granularity rate. Meters are usually end user consumable and, in some examples, sparseness algorithms are applied by default to meters.

In another example metric type, a histogram measures a statistical distribution of values in a stream of data. In addition to minimum, maximum, and mean values (for example), a histogram may also measure median, 75th, 90th, 95th, 98th, 99th, and 99.9th percentiles. Histograms are by definition approximate data structures, so it is safe to subject them to sparseness algorithms and, in some examples, these are applied by default. Regardless of type, some examples may include one or more specified exclusion rules to skip sparseness algorithms for specific metrics.

Figure 10:
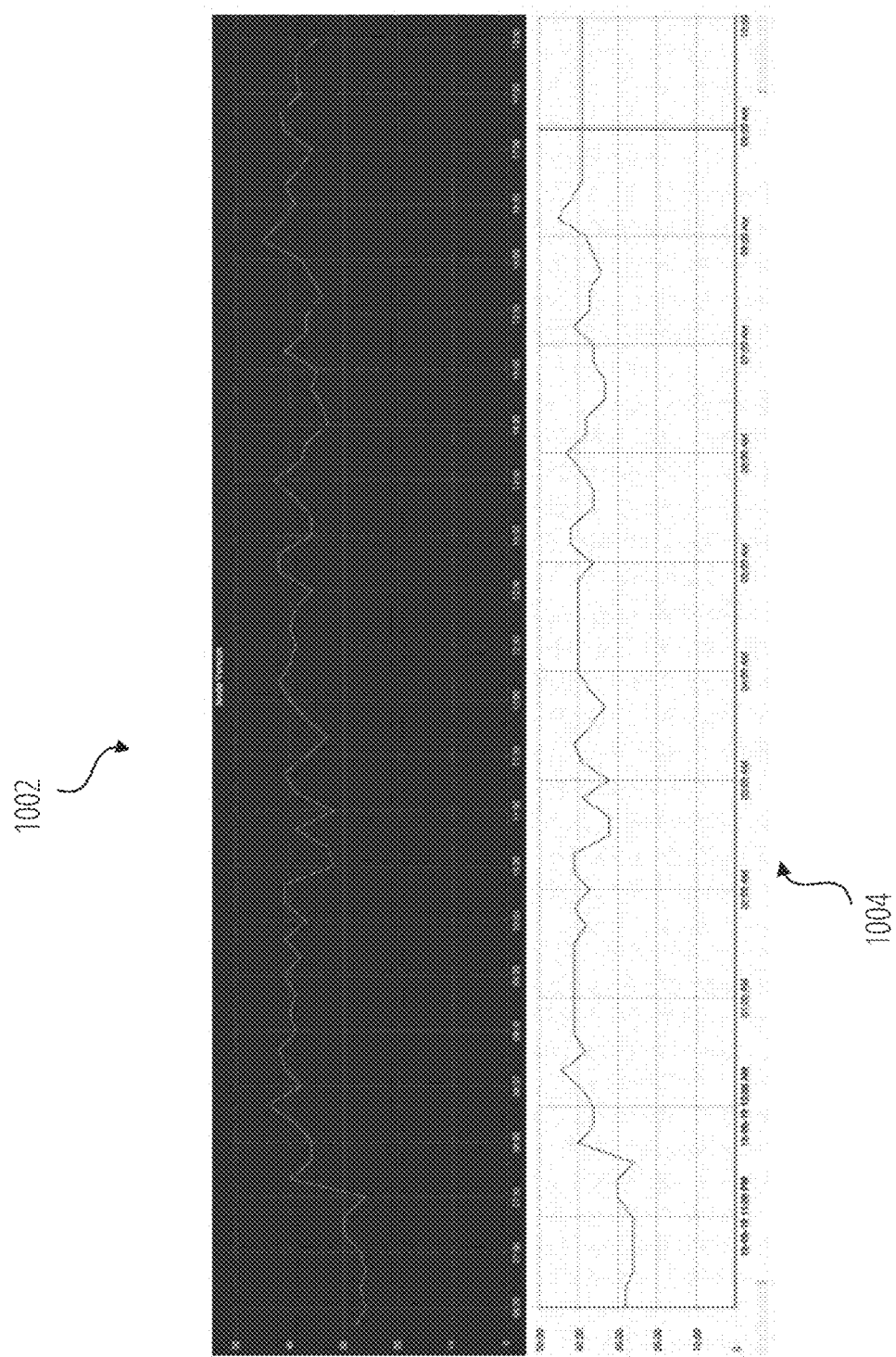
FIG. 10 illustrates an aspect of the subject matter in accordance with one embodiment.

Broadly, sparseness algorithms may be used in two ways to create sparse data: per series level and across series. In series level sparseness, examples consider data points reported in a single time series and drop points that do not show a significant change compared to the last known value. The two graphs in FIG. 10 illustrate this, they represent the same time-series. The top graph 1002 (darker background) represents a traditional time series where at fixed interval a data point was reported. The graph 1004 (lighter background) represents the same series as a sparse series where data points are only reported when there is a significant change from last known value. The graph 1004 includes about 50% fewer data points reported, but still preserves significant information.

In a multi-series approach, some examples are very aggressive in dropping data points and may be introduced by opt-in only, for example where metrics can tolerate large drops. This approach is also more relevant to high dimensional metrics where the cardinality can be extremely large and dense metrics can become prohibitively costly to store. This approach also closely fits with the general theme of present examples, namely store outliers precisely while only keeping normal bands of values. Some multi-series sparseness examples learn or exhibit a significance across multiple dimensions of the same metric. Take the CPU example again, a change from 2% to 5% is quite significant when looked at from perspective of a single time-series, however when observed over the node dimension grouped by version across 30 K timeseries the standard deviation may be 5% itself in which case the 3% delta is well within normal range and not significant. Further, in multi-series sparseness, baseline and normal expected ranges may be determined across dimensional space and examples drop all points of an individual series that lies within an expected range, while preserving the points that fall outside of the range.

Figure 11:
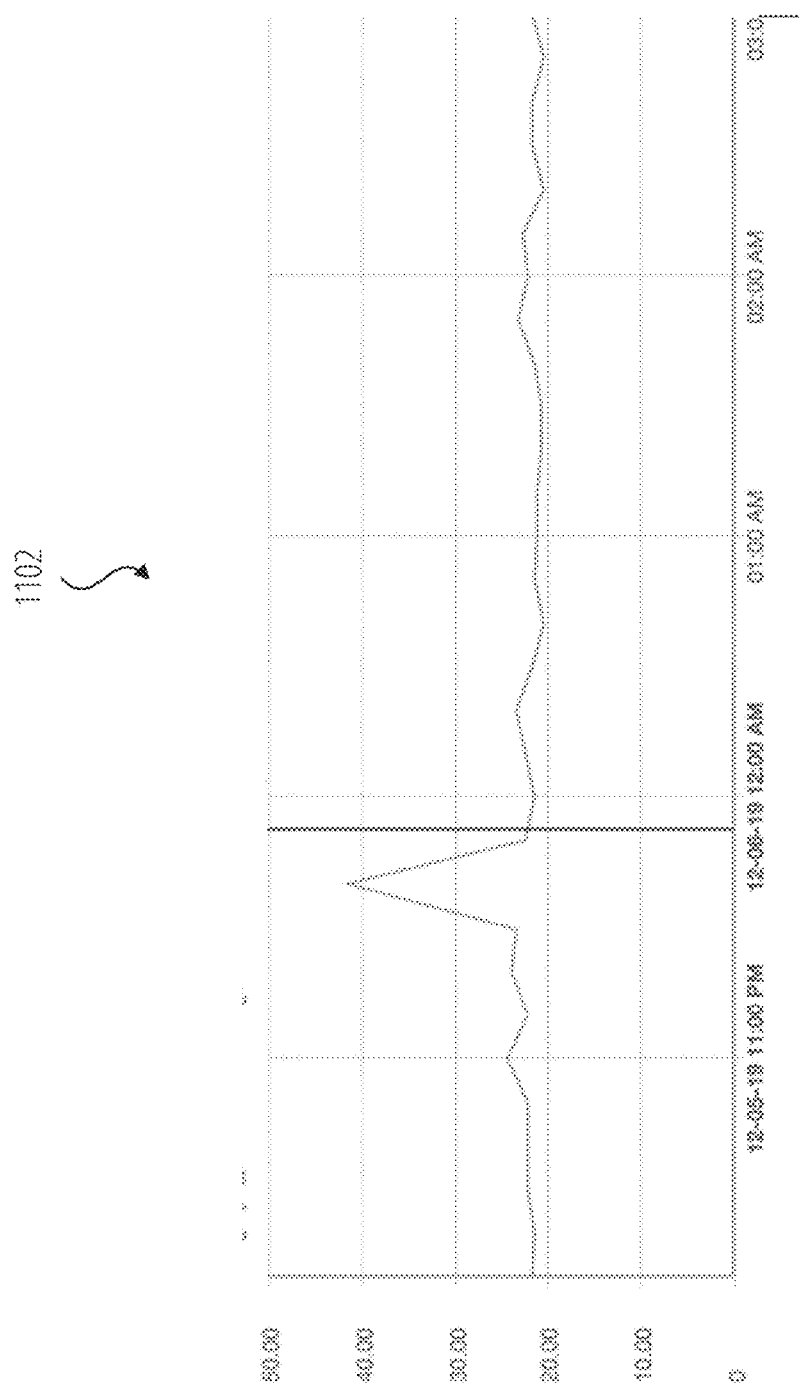
FIG. 11 illustrates an aspect of the subject matter in accordance with one embodiment.
Figure 12:
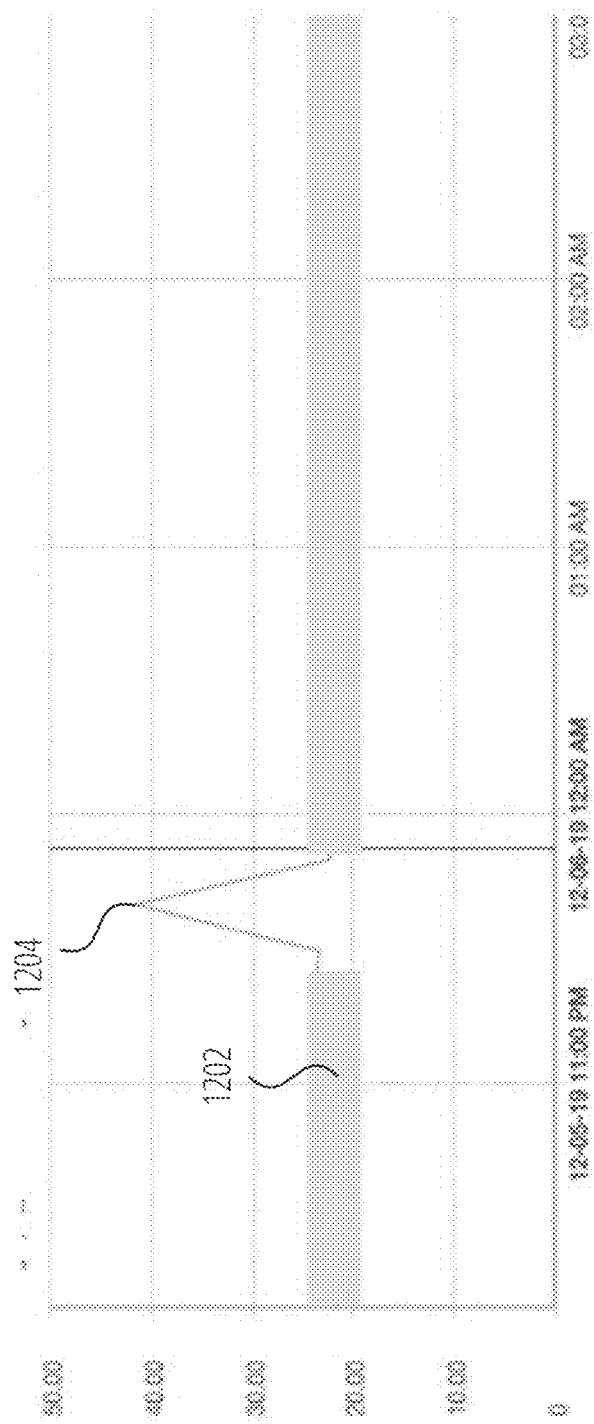
FIG. 12 illustrates an aspect of the subject matter in accordance with one embodiment.

The respective examples in FIG. 11 and FIG. 12 illustrate this concept. An output 1102 of a single-series approach is shown in FIG. 11.

After a multi-series sparseness approach of FIG. 12, most of the series is represented by the expected band 1202 except the case where an outlier 1204 is shown. As a more practical example, a CPU utilization across 30,000 customer deployments can be represented fairly accurately by approximately 10 band 1202. Effectively that translates to a reduction of approximately 3000 times in data points needed to be stored.

The table 1302 shown in FIG. 13 indicates, for a given metric type, a recommended sparseness algorithm, and an observed data drop rate. Any missing data in some examples is represented by an explicit tombstone, if a system generates sparse data than a client may be required to send an explicit tombstone to mark the end of data stream. On the server side assuming the client is not sending sparse data, the last epoch of a time series is maintained, last wall clock time and the expected update interval (10 min or 1 min) and the server will generate a tombstone when the reported data point misses an update.

Examples described thus far teach methods of deriving sparse data to facilitate telemetry applications. A question now arises how to index that data and allow fast query performance. Some time series databases index data points based on a series identifier (metric name+metadata/dimensions). However the occurrence of significant indexing issues is a distinct possibility when telemetry systems wish to support ephemeral series (for example containing ephemeral universal unique identifiers (UUIDs) such as Java Fuzzy Logic (JFL) job UUID) and high cardinality series (for example containing metadata or dimensions with a large range of values). To address these and other issues, FIG. 14 illustrates key components in an anomaly database system 1402.

Figure 14:
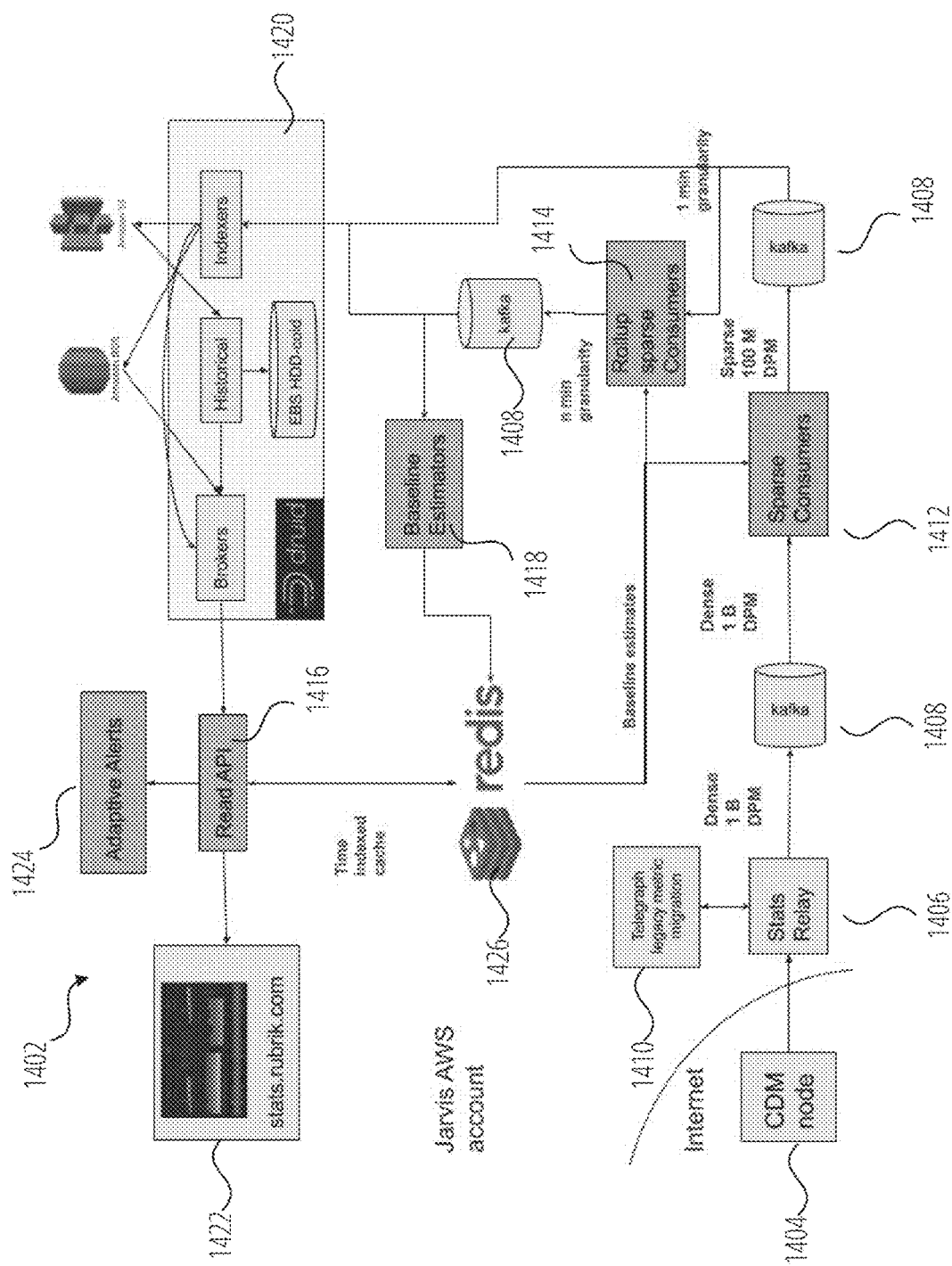
FIG. 14 illustrates an aspect of the subject matter in accordance with one embodiment.

A general architecture of an anomaly database system 1402 is shown in FIG. 14. The components in the anomaly database system 1402 include a CDM node 1404. In some examples, the CDM node 1404 includes a metrics library (described further below), which sends out telemetry data, in particular metrics thereof, in a sparse manner. Some examples use simple sparseness detection algorithms such as diff-value (emit only if different from previous datapoint0 and last-value-delta (emit only if delta of previous value to current value is above threshold). The metrics library store these metrics locally and sends a copy to the cloud (e.g., by statistics relay 1406) so that the data can be stored permanently. The local storage may only retain metrics for the last 7 days, or another period, for example. The statistics relay 1406 is mainly responsible for receiving streaming metrics from a plurality of CDM nodes, of which the CDM node 1404 may form part. The statistics relay 1406 performs some basic blacklisting and whitelisting to cut down the incoming metrics, and pushes all metrics to a metrics collector such as Kafka 1408.

In some examples, the metric library allows new metrics to be created using a tag based schema that the anomaly database system 1402 may require. In order to support legacy metrics, examples may include a Telegraph plugin (telegraph legacy metric migration 1410) that can convert a flat format heuristically to a tag based format. The anomaly database system 1402 also includes a sparse consumers module 1412.

Figure 15:
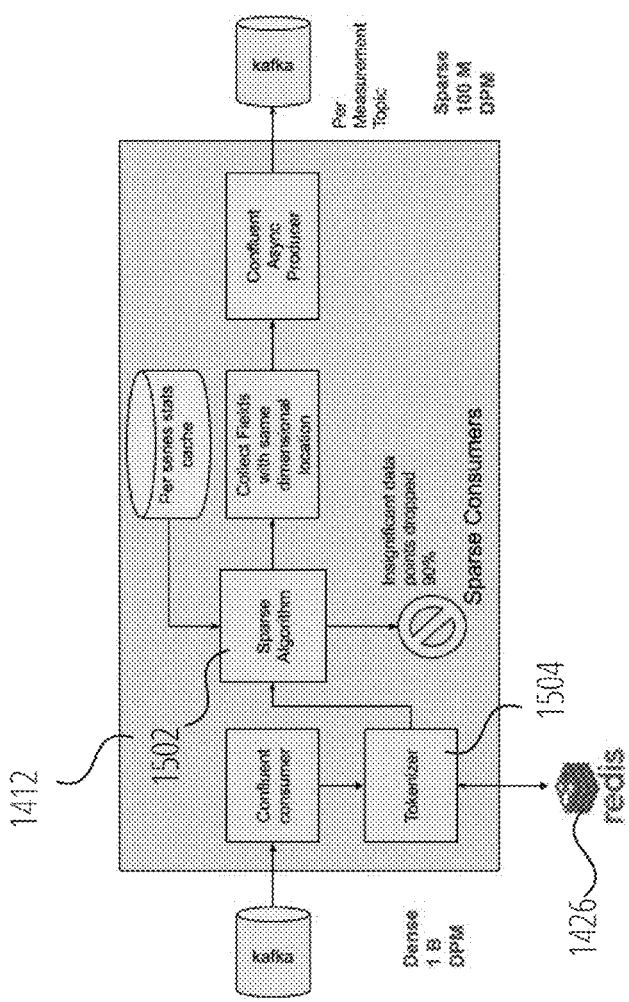
FIG. 15 illustrates an aspect of the subject matter in accordance with one embodiment.

A detailed view showing aspects of an instance of the sparse consumers module 1412 is shown in FIG. 15. The sparse consumers module 1412 pulls metrics that were pushed by statistics relay 1406 from Kafka 1408. It will be noted with reference to FIG. 14 that metrics data on the "upstream" side of the sparse consumers module 1412 is dense (e.g. 1B DPM), whereas metrics data on the "downstream" side of the sparse consumers module 1412 is sparse (e.g. 100M DPM).

FIG. 15 shows a more detailed view of components of an example sparse consumers module 1412. FIG. 15 includes an example write path of a sparse consumers module 1412. As mentioned above, metrics data on the "upstream" side of the sparse consumers module 1412 is dense (e.g. 1B DPM), whereas metrics data on the "downstream" side of the sparse consumers module 1412 is sparse (e.g. 100M DPM). In this regard, example sparse consumers modules 1412 run algorithms, such as sparse algorithm 1502, to cut down on the number of data points. The example algorithms listed below may be supported.

In the following example sparse algorithms: current_value refers to the value received, and last_value refers to the last value written. Thus is a diff-value algorithm (Lossless), DROP IF current_value=last_value; in a last-value-delta algorithm (useful for all metric types other than counter), DROP IF (current_value−last_value)/last_value<threshold; in a derivative-delta algorithm (useful for counters) a current_derivative=(current_value−last_value)/(current_epoch−last_epoch), a last_derivative=[previous current_derivative written], DROP IF current_derivative/last_derivative<threshold; in a stddev band, DROP IF moving_avg−stddev<current_value<moving_avg+stddev; in a stddev band with last-value fallback, DROP IF else DROP IF #2; and, in a last-value-delta with percentile, DROP IF (current_value−last_value)/95thtPercentile_value<threshold, where 95thPercentile is computed over a moving window.

Of all these algorithms, the last-value-delta has the least cost and reasonable result. The other algorithms provide better drop rates but at a higher computation and memory cost. All the algorithms above require storage either of the last value or recent history for each series. This may be stored in a stats cache that lives in memory. In some examples, a single metric consumer will see all the metrics from a particular node, thus a fairly high cache hit ratio may be expected with very few duplicate entries across metric consumers. In some examples, a user can override default behavior by editing a schema.yaml file, this way metrics that should be maintained in original fidelity can be preserved.

Some sparseness examples may be bounded. The sparseness algorithms described so far publish a point only if it has changed significantly. For illustration, consider a time series that is always reporting a value of 1 every 10 mins for the whole year. The sparseness algorithm will drop all points for this series except the very first point reported at the beginning.

Sparseness can be very helpful from a storage perspective. However, in some case, some examples may hide sparseness from the end user, so that user queries can be simplified and do not have to account for missing data. This translation of sparse to dense data creates problems for read path and data purge: Read path: examples need to know the last value to compute or report results in a specific time range. In a multi-dimensional metric if some series are very sparse like the example above, in which event some examples can force the Read path to read all segments for the entire year to generate results for just the last hour. In purge, purging data older than the configured retention period may be key to containing data storage costs. However, for unbounded sparseness, a segment cannot be dropped immediately because the oldest data might be needed to do a sparse-to-dense conversion. For example, consider the example of a time series which is generating a value of 1 every 10 mins for a whole year, and has a retention of 1 year. Say we stored a value for 1 Jan. 2019 00:00:00 and no data points thereafter since they were similar. That first data point on 1 Jan. 2020 cannot be deleted because it is needed for dense conversion.

Examples address these problems by introducing bounded sparseness, where examples add another condition that two consecutive sparse points must not be more than a half of a segment interval apart. This ensures that each segment contains the last valid value of each series. This allows the read path to limit its queries to relevant segments only and allows an applicable purge policy to drop segments based on their age without having to scan their contents, because any value in them is safely replicated in future segments as well. This may come at some additional cost of duplicating values that otherwise would have been dropped. However the simplification of purge and read path may justify the additional cost.

Some examples of an anomaly database system 1402 may include a tokenizer 1504. A tokenizer maps verbose human friendly metadata names to token values in an integer namespace. Based on data from an example node a tokenizer can reduce metadata size by 85%. Note this is different then compression. Because unlike a compressed form, all of the sparseness algorithms can still operate on the tokenized data points, this includes druid and a read api (for example read API 1416 in FIG. 14). In some examples, the de-tokenization occurs in read API 1416 just before results are returned to a user. A read API 1416 cache may also store results in tokenized format.

In some examples, a token map can be built offline to generate an immutable token map that can be loaded directly in memory. This removes the need for any synchronization between containers and will not have any negative impact on throughput. An offline token building process allows examples to perform global optimizations in assigning smaller token values to high frequency words. Tokenization may not be applicable to ephemeral tag values, mainly because it will significantly increase the number of tokens and examples may lose the compression factor obtained from tokenization.

Figure 16:
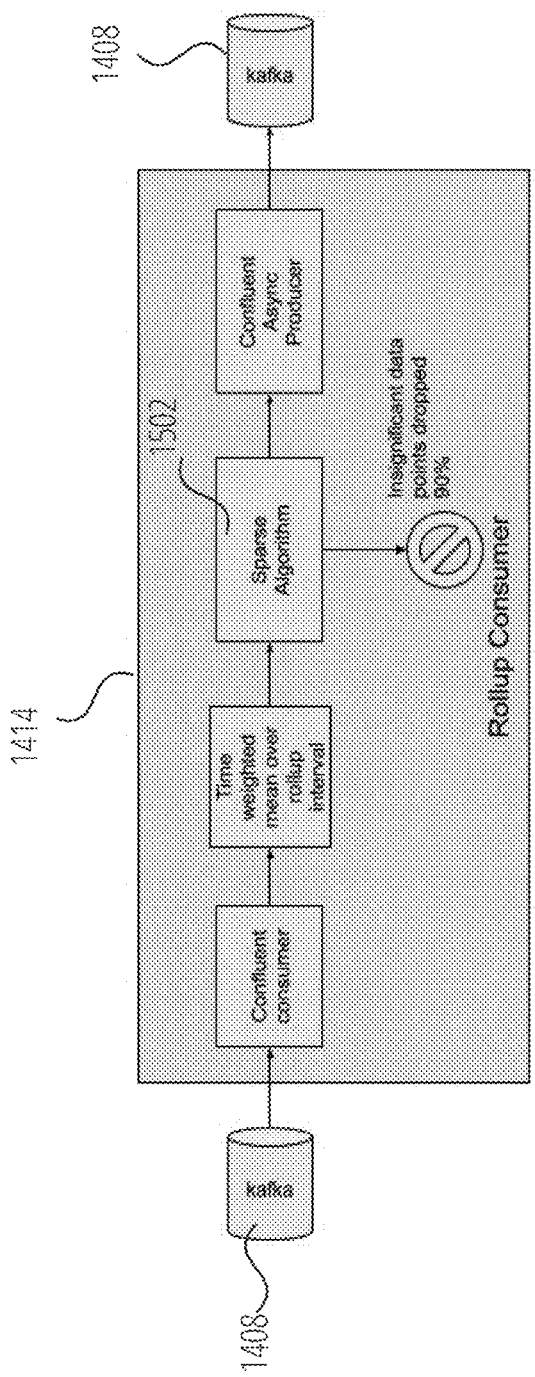
FIG. 16 illustrates an aspect of the subject matter in accordance with one embodiment.

As mentioned above, the anomaly database system 1402 includes a rollup module 1414 in some examples. A detailed example is shown in FIG. 16. Performing rollups conveniently enables read queries over very large time ranges. In absence of rollups such queries can request large volumes of data from the backend. With rollups examples can reduce the volume of data points requested without loss of efficacy. In some examples, a rollup module 1414 is implemented in a metric consumer and operates on sparse data to compute a time weighted mean over a rollup window. Optimal rollup intervals can change dramatically based on query patterns and the exact rollup window may be fine-tuned based on usage data. As noted in FIG. 16, insignificant data points can be dropped by as much as 90%.

The anomaly database system 1402 may also include a baseline estimator 1418. The goal of a baseline estimator 1418 is to pre-compute baselines on streaming data to enable anomaly detection, correlations and multi-series sparseness. The baseline estimator 1418 may communicate with a time-indexed cache 1426, such as Redis. Redis is an open source (BSD licensed), in-memory data structure store, used as a database, cache and message broker. It supports data structures such as strings, hashes, lists, sets, sorted sets with range queries, bitmaps, hyperlogs, geospatial indexes with radius queries and streams.

The anomaly database system 1402 may also include, in a backend, a real-time analytics database 1420, such as Apache Druid. Apache Druid is a database that is most often used for powering use cases where real-time ingest, fast query performance, and high uptime are important. As such, Druid is commonly used for powering GUIs of analytical applications, or as a backend for highly-concurrent APIs that need fast aggregations. The real-time analytics database 1420 may include an index and value function. For example, the real-time analytics database 1420 may provide an index along with the value store makes it easier to build a TSDB without requiring a second indexing solution. The real-time analytics database 1420 may include a time based index in which segments are partitioned by time. This also implies that the real-time analytics database 1420 can support ephemeral tag values natively since time-based indexing prevents an error.

The real-time analytics database 1420 may further include a co-located dimensional space. Thus, some examples include a data model that stores all dimensional series of a metric in the same data source. In some examples, all the dimensional data for a particular metric is stored in the same segment. A common read access pattern is to provide an aggregate over the dimensional space of a particular metric. This colocation of data allows an amortization of total cost. For example, to illustrate this let us imagine a metric: CPU utilization, the dimensional space is cores X nodes. If each node has 10 cores and we have 30 K nodes, then we will have 300 K time series. A read query may want to plot the average CPU usage across all cores and nodes, such a query will need to read all 300 K time series in order to compute the aggregated value. If this data is modelled in Cassandra, a typical data model would be to have a partition key per series. This implies we will have 300 K keys that will need a lookup. This data can get scattered over many SSTables and our aggregate query may be required to load many SSTables, where the actual useful data per SSTable is very small. In present examples, an anomaly database system 1402 that includes Druid (for example) can model this such that the CPU usage across all dimensions (nodes, cores) is stored in a single data source which translates to all 300K series will be packed into a single segment. So our example read query will result in loading a single segment and most of the data in the segment will be useful.

In some examples, an anomaly database system 1402 includes data models. An example schema 1702 is shown in FIG. 17. Druid data model for example starts with a datasource which has dimensions and metrics. An example anomaly database system 1402 supports an Influx schema. The schema 1702 may include measurement, field and tags.

Another example schema 1802 is shown in FIG. 18. This tagged schema example includes measurement (for example diamond.process), tags (for example cluster and node), and fields (for example CPU and disk). This data model encourages collocating all series associated with a particular field into a single segment. This also encourages collocating all fields that are likely to be displayed or accessed together based on the common measurement.

A graphite flat schema example is show at schema 1902 in FIG. 19.

Figure 20:
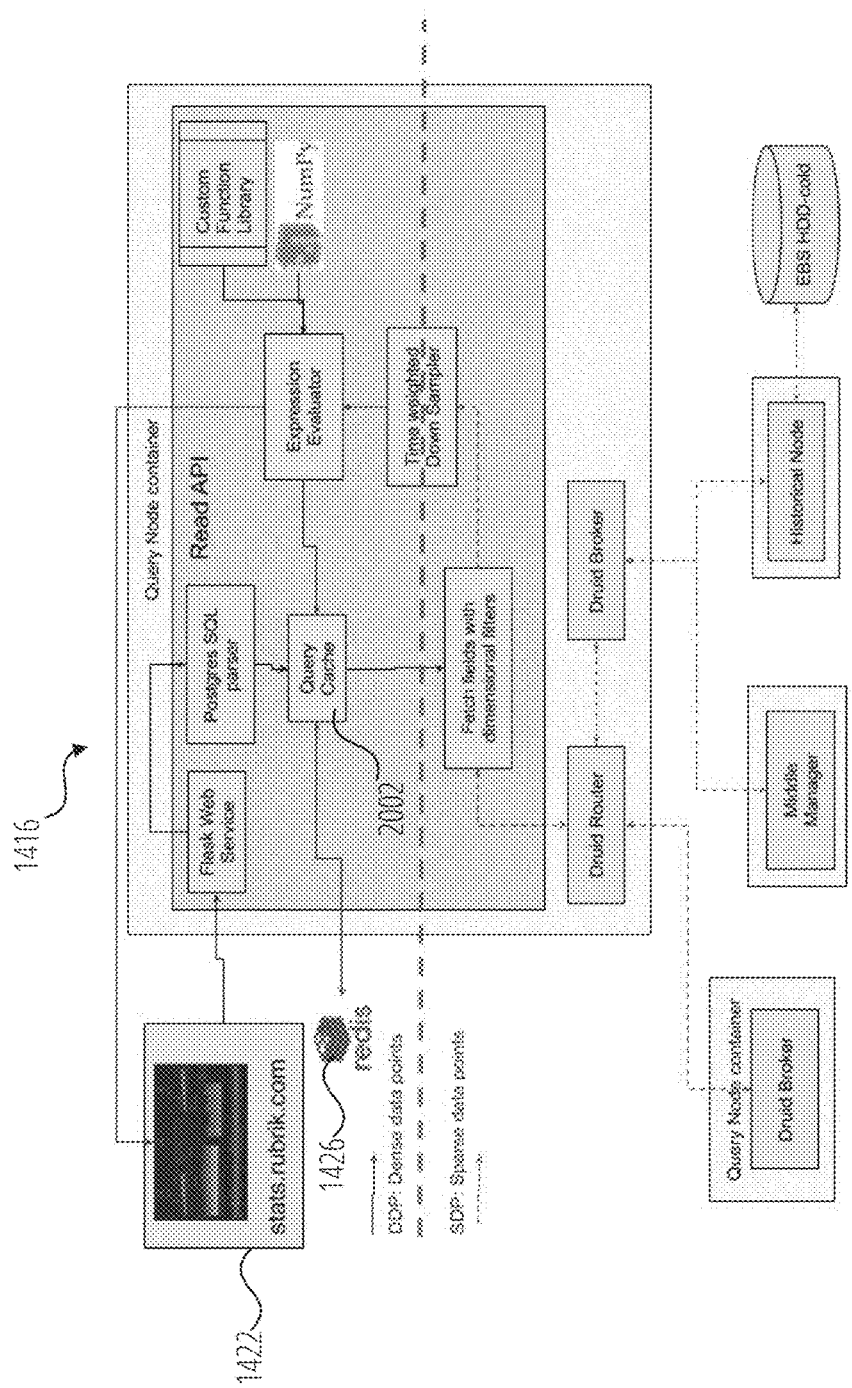
FIG. 20 illustrates an aspect of the subject matter in accordance with one embodiment.

As mentioned above, an example anomaly database system 1402 includes a read API 1416. FIG. 20 illustrates the major components of the read API 1416. In some examples, the read API 1416 provides an interface, such as an Influx query language (QL) interface (see schema 1702 above) to metrics stored in the anomaly database system 1402. Some examples may include a custom implementation instead of directly using druid API for the following reasons: the need for sparse data—a Druid API for example has no notion of sparse data, so any aggregation will not generate correct results; cross data source aggregation—Druid for example does not support cross data source aggregation; and in light of certain Influx QL and custom functions.

In some examples, the read API 1416 includes its own query cache 2002, despite the fact that Druid (for example) also provides caching capabilities. The main motivator for a local query cache 2002 is that the anomaly database system 1402 may perform significant aggregations in the read API 1416 and the cost of doing that can be amortized by caching at the top level. Another motivator is the type of cache that an anomaly database system 1402 may use, the common case in dashboards is to repeat the same query with the same interval at a continuous refresh rate. Here is an example query from Grafana set to auto-refresh with the last 1 hour window. SELECT mean("diamond.user_percent") FROM "tsdb" WHERE time>=now( )−1 h AND cluster='f5888c22-9651-4cd0-8e3a-90367d9242c71' AND node='RVHMZ321A719' GROUP BY time(10s). The above query is repeated every 10s generating a moving window of data points. Since the query has a relative time-definition, examples take care in using simple caches which will generate a hit against the query and return stale data. An example read API 1416 parser converts the relative time to absolute time and then from the Druid's perspective such queries are new queries every time and may not generate a cache hit. The query cache 2002 built up uses the query without the time-range as a key, and caches the results by time ranges. The query cache 2002 can thus give partial hits of part of the time range that is in the cache. In some examples, the cached results are stored in memory of the Read API task and are also backed up in time-indexed cache 1426 (e.g. Redis). The time-indexed cache 1426 (Redis) allows examples to leverage a larger RAM and collect cache results from multiple read api nodes. The v0 cached results are not stored compressed, examples may enable compression based on the cost of compression versus the benefit of more cache space.

An example anomaly database system 1402 may include a user interface 1422. An example user interface 1422 may include a Grafana dashboarding user interface (UI) that can be used for visualizing metrics from the anomaly database system 1402.

With reference back to FIG. 14, an example anomaly database system 1402 may also include an alerts framework 1424. An example alerts framework 1424 may query a TSDB with two kind of queries: baseline queries and check queries. Both the queries typically operate over the entire dimensional space. Baseline queries are typically executed over a 10 day period at 10 minute granularity once a day. Check queries are typically executed over last hour period at 10 minute granularity every 10 minutes. Baseline queries are extremely expensive because they request a very large volume of data, but these are infrequent queries (1/day per alert). Check queries are inexpensive because they are scoped to most recent data but these are very frequent (1/10 minute per alert). Some example anomaly database systems 1402 implement baseline algorithms and anomaly detection algorithms natively in the read API 1416 where these algorithms are able to operate on sparse data directly. This reduces overall read workload from the alerts framework 1424 by the same order of magnitude that sparseness reduces the write workload. Additionally, this also provides an added benefit that developers can query for anomalous events directly from the anomaly database system 1402 instead of relying on an alert framework which files jira tickets.

In some example anomaly database systems 1402, access is restricted by security groups that only allow machines within the anomaly database system 1402 to communicate among each other. Only the read API 1416 is exposed outside of the anomaly database system 1402 security group through an endpoint (for example, https://anomalydb.rubrik.com). This endpoint may also be restricted to product security groups and VPN.

In some examples, the anomaly database systems 1402 is a complex system containing many parts and each of these needs to be carefully monitored. In some instances, an anomaly database system 1402 should not store its own telemetry to avoid situations where the anomaly database system 1402 is misbehaving and an operator has no visibility into that because system metrics were lost. For this reason in some examples all telemetry generated by an anomaly database system 1402 itself is stored in an external database, such as MetricTank and Amazon Web Service (AWS) cloudwatch. Dashboards such as Grafana Dashboard and Cloudwatch Dashboard may track overall activity.

With reference to FIG. 21, certain operations in an example computer-implemented method 2100 at a networked computing system are provided. An example method 2100 processes metrics in telemetry data in an anomaly database system comprising a CDM node. An example method 2100 comprises: at operation 2102, receiving by a statistics relay streaming metrics from nodes in a node cluster, the node cluster including the CDM node, the statistics relay pushing the received metrics to a metrics collector; and, at operation 2104, pulling metrics, by a sparse consumers module, from the metrics collector.

In some examples, the operations further comprise running a sparse algorithm on the pulled metrics to reduce a number of data points. In some examples, the sparse algorithm is selected from a group of sparse algorithms comprising: a diff-value algorithm, a last-value-delta algorithm, a standard deviation band algorithm, a standard deviation band algorithm with a last-value fallback, and a last-value-delta with percentile algorithm. In some examples, values generated by the sparse algorithm are bounded and assigned a publication status based on falling within a bounded value.

In some examples, the operations further comprise enabling read queries, by a rollup module, over a designated time range.

In some examples, the operations further comprise precomputing baselines on the streaming metrics to enable anomaly detection, correlations and multi-series sparseness.

In some examples, a non-transitory machine-readable medium includes instructions which, when read by a machine (apparatus), cause the machine to perform operations in a method of processing metrics in telemetry data in an anomaly database system comprising a CDM node. Example operations may include the operations summarized above.

Figure 22:
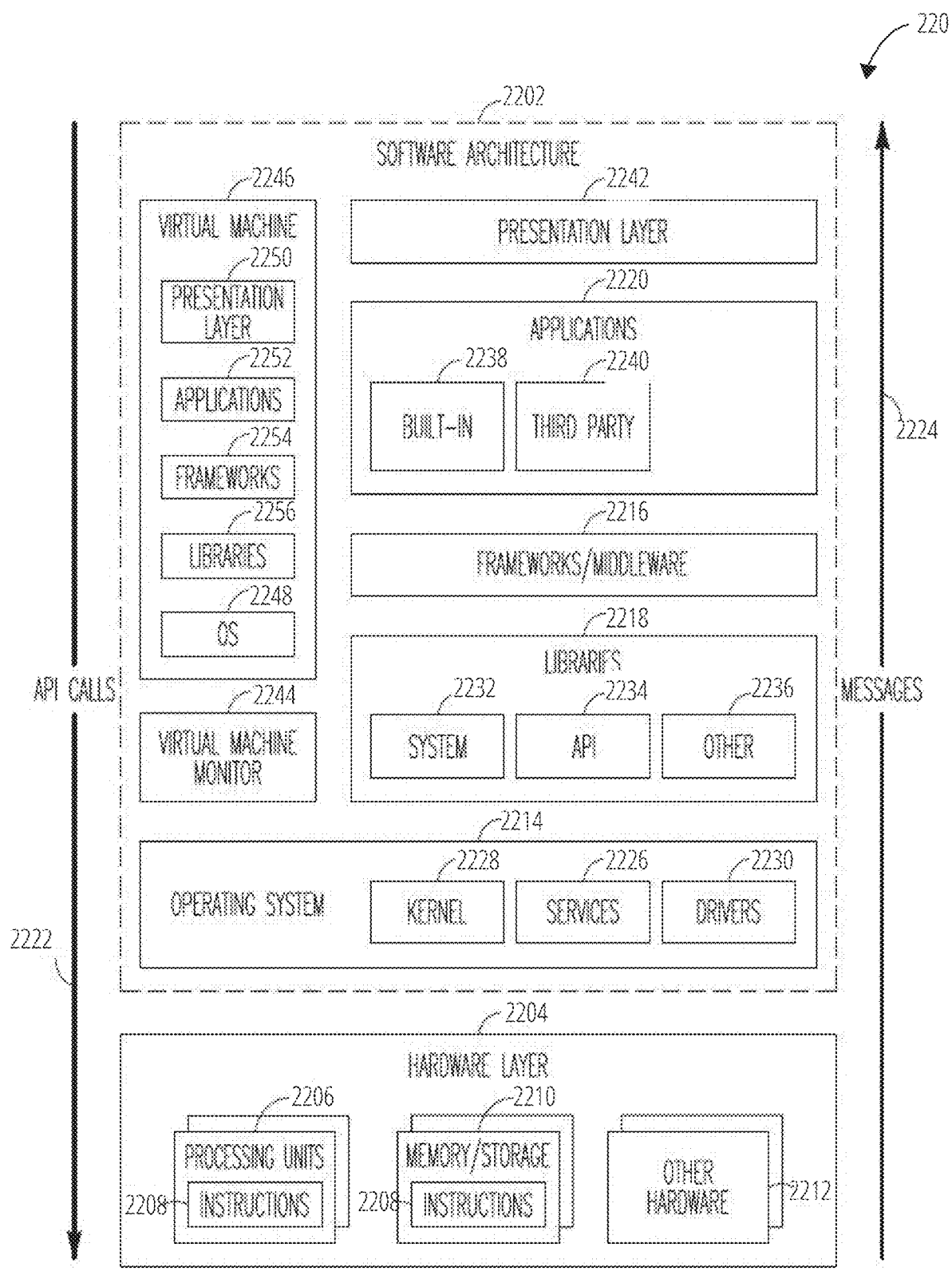
FIG. 22 depicts a block diagram illustrating an example of a software architecture that may be installed on a machine, according to some example embodiments.

FIG. 22 is a block diagram illustrating an example of a computer software architecture for data classification and information security that may be installed on a machine, according to some example embodiments. FIG. 22 is merely a non-limiting example of a software architecture 2202, and it will be appreciated that many other architectures may be implemented to facilitate the functionality described herein. The software architecture 2202 may be executing on hardware such as a machine 2400 of FIG. 24 that includes, among other things, processor 2346, memory 2348, and I/O components 2350. A representative hardware layer 2204 of FIG. 22 is illustrated and can represent, for example, the machine 2400 of FIG. 24. The representative hardware layer 2204 of FIG. 22 comprises one or more processing units 2206 having associated executable instructions 2208. The executable instructions 2208 represent the executable instructions of the software architecture 2202, including implementation of the methods, modules, and so forth described herein. The representative hardware layer 2204 also includes memory or storage modules 2210, which also have the executable instructions 2208. The representative hardware layer 2204 may also comprise other hardware 2212, which represents any other hardware of the representative hardware layer 2204, such as the other hardware illustrated as part of the machine 220.

In the example architecture of FIG. 22, the software architecture 2202 may be conceptualized as a stack of layers, where each layer provides particular functionality. For example, the software architecture 2202 may include layers such as an operating system 2214, libraries 2218, frameworks and/or middleware 2216, applications 2220, and a presentation layer 2242. Operationally, the applications 2220 or other components within the layers may invoke API calls 2222 through the software stack and receive a response, returned values, and so forth (illustrated as messages 2224) in response to the API calls 2222. The layers illustrated are representative in nature, and not all software architectures have all layers. For example, some mobile or special purpose operating systems may not provide a frameworks and/or middleware 2216 layer, while others may provide such a layer. Other software architectures may include additional or different layers.

The operating system 2214 may manage hardware resources and provide common services. The operating system 2214 may include, for example, a kernel 2228, services 2226, and drivers 2230. The kernel 2228 may act as an abstraction layer between the hardware and the other software layers. For example, the kernel 2228 may be responsible for memory management, processor management (e.g., scheduling), component management, networking, security settings, and so on. The services 2226 may provide other common services for the other software layers. The drivers 2230 may be responsible for controlling or interfacing with the underlying hardware. For instance, the drivers 2230 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 2218 may provide a common infrastructure that may be utilized by the applications 2220 and/or other components and/or layers. The libraries 2218 typically provide functionality that allows other software modules to perform tasks in an easier fashion than by interfacing directly with the underlying operating system 2214 functionality (e.g., kernel 2228, services 2226, or drivers 2230). The libraries 2218 may include system libraries 2232 (e.g., C standard library) that may provide functions such as memory allocation functions, string manipulation functions, mathematic functions, and the like. In addition, the libraries 2218 may include API libraries 2234 such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 2218 may also include a wide variety of other libraries 2236 to provide many other APIs to the applications 2220 and other software components/modules.

The frameworks (also sometimes referred to as middleware) may provide a higher-level common infrastructure that may be utilized by the applications 2220 or other software components/modules. For example, the frameworks and/or middleware 2216 may provide various graphic user interface (GUI) functions, high-level resource management, high-level location services, and so forth. The frameworks and/or middleware 2216 may provide a broad spectrum of other APIs that may be utilized by the applications 2220 and/or other software components/modules, some of which may be specific to a particular operating system or platform.

The applications 2220 include built-in applications 2238 and/or third-party applications 2240. Examples of representative built-in applications 2238 may include, but are not limited to, a home application, a contacts application, a browser application, a book reader application, a location application, a media application, a messaging application, or a game application.

The third-party applications 2200 may include any of the built-in applications 2238, as well as a broad assortment of other applications. In a specific example, the third-party applications 2200 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party applications 2200 may invoke the API calls 2222 provided by the mobile operating system such as the operating system 2214 to facilitate functionality described herein.

The applications 2220 may utilize built-in operating system functions (e.g., kernel 2228, services 2226, or drivers 2230), libraries (e.g., system libraries 2232, API libraries 2234, and other libraries 2236), or frameworks and/or middleware 2216 to create user interfaces to interact with users of the system. Alternatively, or additionally, in some systems, interactions with a user may occur through a presentation layer 2250, such as the presentation layer 2242. In these systems, the application/module "logic" can be separated from the aspects of the application/module that interact with the user.

Some software architectures utilize virtual machines. In the example of FIG. 22, this is illustrated by a virtual machine 2246. A virtual machine creates a software environment where applications/modules can execute as if they were executing on a hardware machine e.g., the machine 2400 of FIG. 24, for example). A virtual machine 2246 is hosted by a host operating system (e.g., operating system 2214) and typically, although not always, has a virtual machine monitor 2244, which manages the operation of the virtual machine 2246 as well as the interface with the host operating system (e.g., operating system 2214). A software architecture executes within the virtual machine 2246, such as an operating system 2248, libraries 2256, frameworks/middleware 2254, applications 2252, or a presentation layer 2242. These layers of software architecture executing within the virtual machine 2246 can be the same as corresponding layers previously described or may be different.

Figure 23:
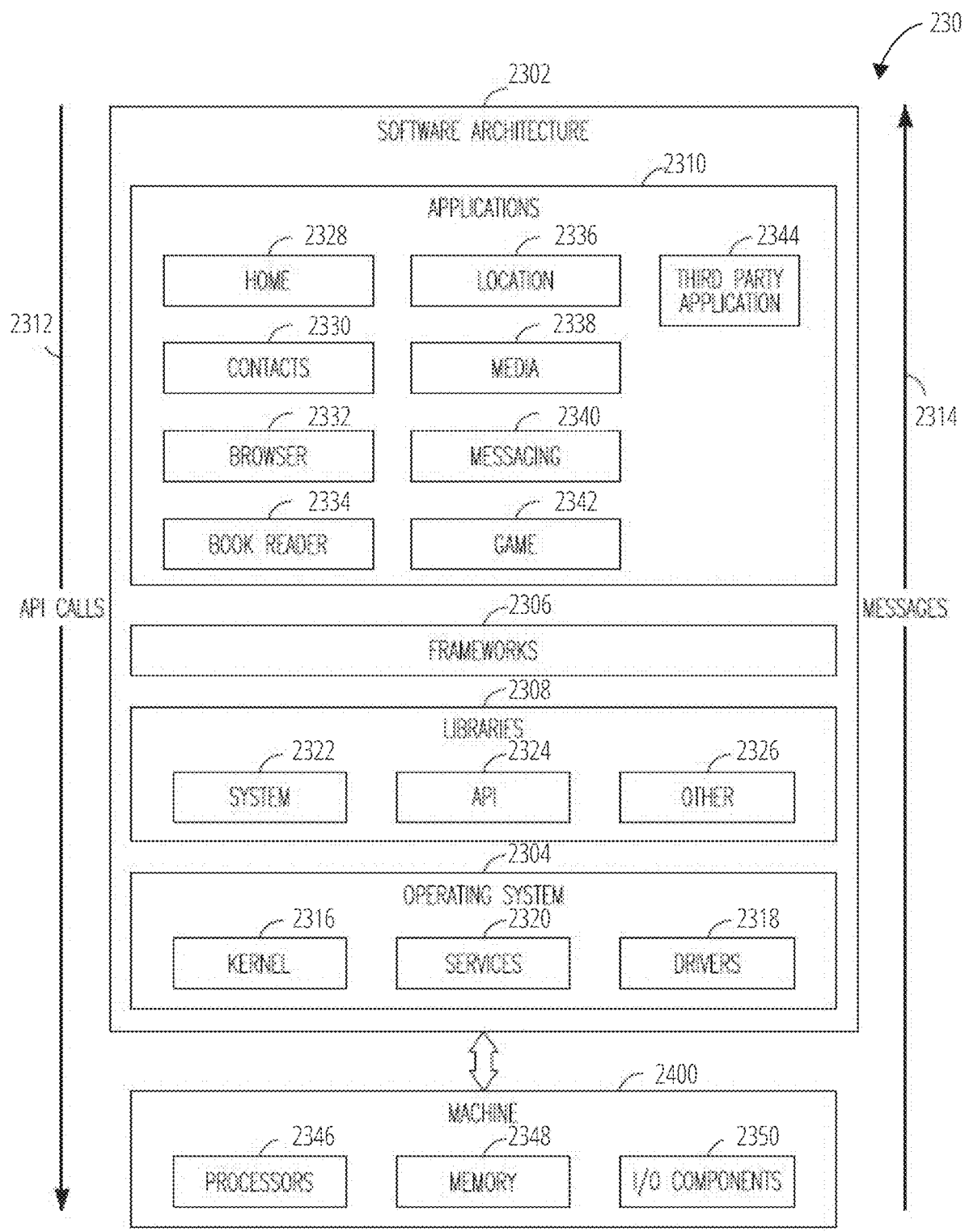
FIG. 23 depicts a block diagram illustrating an architecture of software, according to an example embodiment

FIG. 23 is a block diagram 230 illustrating an architecture of software 2302, which can be installed on any one or more of the devices described above. FIG. 23 is merely a non-limiting example of a software architecture, and it will be appreciated that many other architectures can be implemented to facilitate the functionality described herein. In various embodiments, the software 2302 is implemented by hardware such as a machine 2400 of FIG. 24 that includes processor(s) 2346, memory 2348, and I/O components 2350. In this example architecture, the software 2302 can be conceptualized as a stack of layers where each layer may provide a particular functionality. For example, the software 2302 includes layers such as an operating system 2304, libraries 2308, frameworks 2306, and applications 2310. Operationally, the applications 2310 invoke API calls 2312 (application programming interface) through the software stack and receive messages 2314 in response to the API calls 2312, consistent with some embodiments.

In various implementations, the operating system 2304 manages hardware resources and provides common services. The operating system 2304 includes, for example, a kernel 2316, services 2320, and drivers 2318. The kernel 2316 acts as an abstraction layer between the hardware and the other software layers, consistent with some embodiments. For example, the kernel 2316 provides memory management, processor management (e.g., scheduling), component management, networking, and security settings, among other functionality. The services 2320 can provide other common services for the other software layers. The drivers 2318 are responsible for controlling or interfacing with the underlying hardware, according to some embodiments. For instance, the drivers 2318 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 2308 provide a low-level common infrastructure utilized by the applications 2310. The libraries 2308 can include system libraries 2322 (e.g., C standard library) that can provide functions such as memory allocation functions, string manipulation functions, mathematic functions, and the like. In addition, the libraries 2308 can include API libraries 2324 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 2308 can also include a wide variety of other libraries 2326 to provide many other APIs to the applications 2310.

The frameworks 2306 provide a high-level common infrastructure that can be utilized by the applications 2310, according to some embodiments. For example, the frameworks 2306 provide various graphic user interface (GUI) functions, high-level resource management, high-level location services, and so forth. The frameworks 2306 can provide a broad spectrum of other APIs that can be utilized by the applications 2310, some of which may be specific to a particular operating system or platform.

In an example embodiment, the applications 2310 include a home application 2328, a contacts application 2330, a browser application 2332, a book reader application 2334, a location application 2336, a media application 2338, a messaging application 2340, a game application 2342, and a broad assortment of other applications, such as a third-party application 2344. According to some embodiments, the applications 2310 are programs that execute functions defined in the programs. Various programming languages can be employed to create one or more of the applications 2310, structured in a variety of manners, such as object-oriented programming languages (e.g., Objective-C, Java, or C++) or procedural programming languages (e.g., C or assembly language). In a specific example, the third-party application 2344 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 2344 can invoke the API calls 2312 provided by the operating system 2304 to facilitate functionality described herein.

Figure 24:
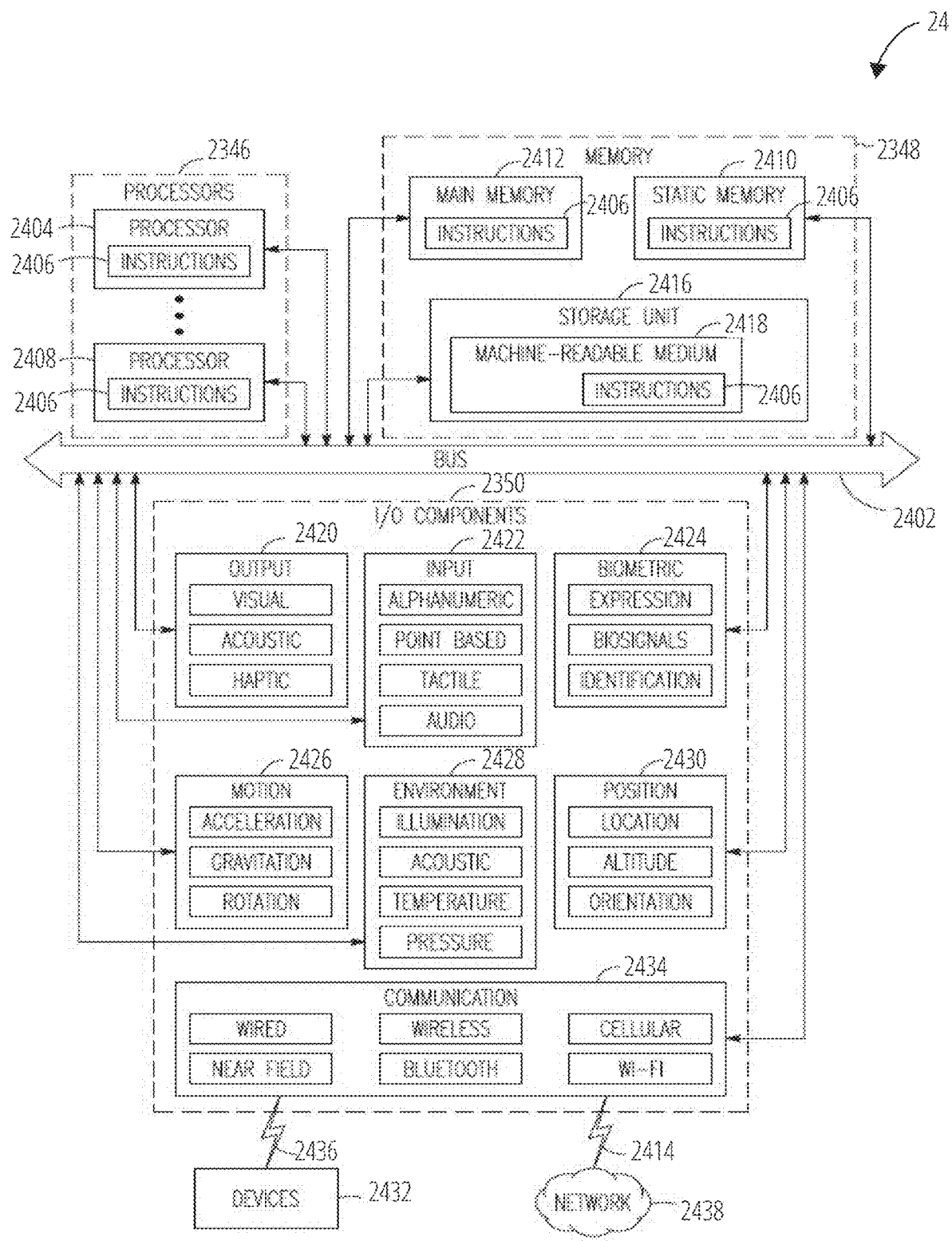
FIG. 24 illustrates a diagrammatic representation of a machine 1000 in the form of a computer system within which a set of instructions may be executed for causing a machine to perform any one or more of the methodologies discussed herein, according to an example embodiment.

FIG. 24 illustrates a diagrammatic representation of a machine 2400 in the form of a computer system within which a set of instructions may be executed for causing the machine to perform any one or more of the methodologies discussed herein, according to an example embodiment. Specifically, FIG. 24 shows a diagrammatic representation of the machine 2400 in the example form of a computer system, within which instructions 2406 (e.g., software, a program, an application, an applet, an app, or other executable code) for causing the machine 2400 to perform any one or more of the methodologies discussed herein may be executed. Additionally, or alternatively, the instructions 2406 may implement the operations of the method shown in FIG. 21, or as elsewhere described herein.

The instructions 2406 transform the general, non-programmed machine 2400 into a particular machine 2400 programmed to carry out the described and illustrated functions in the manner described. In alternative embodiments, the machine 2400 operates as a standalone device or may be coupled (e.g., networked) to other machines. In a networked deployment, the machine 2400 may operate in the capacity of a server machine or a client machine in a server-client network environment, or as a peer machine in a peer-to-peer (or distributed) network environment. The machine 2400 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 2406, sequentially or otherwise, that specify actions to be taken by the machine 240. Further, while only a single machine 2400 is illustrated, the term "machine" shall also be taken to include a collection of machines 2400 that individually or jointly execute the instructions 2406 to perform any one or more of the methodologies discussed herein.

The machine 2400 may include processor(s) 2346, memory 2348, and I/O components 2350, which may be configured to communicate with each other such as via a bus 2402. In an example embodiment, the processor(s) 2346 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 2404 and a processor 2408 that may execute the instructions 2406. The term "processor" is intended to include multi-core processors that may comprise two or more independent processors (sometimes referred to as "cores") that may execute instructions contemporaneously. Although FIG. 24 shows multiple processor(s) 2346, the machine 2400 may include a single processor with a single core, a single processor with multiple cores (e.g., a multi-core processor), multiple processors with a single core, multiple processors with multiples cores, or any combination thereof.

The memory 2348 may include a main memory 2412, a static memory 2410, and a storage unit 2416, each accessible to the processor(s) 2346 such as via the bus 2402. The main memory 2412, the static memory 2410, and storage unit 2416 store the instructions 2406 embodying any one or more of the methodologies or functions described herein. The instructions 2406 may also reside, completely or partially, within the main memory 2412, within the static memory 2410, within the storage unit 2416, within at least one of the processor(s) 2346 (e.g., within the processor's cache memory), or any suitable combination thereof, during execution thereof by the machine 240.

The I/O components 2350 may include a wide variety of components to receive input, provide output, produce output, transmit information, exchange information, capture measurements, and so on. The specific I/O components 2350 that are included in a particular machine will depend on the type of machine. For example, portable machines such as mobile phones will likely include a touch input device or other such input mechanisms, while a headless server machine will likely not include such a touch input device. It will be appreciated that the I/O components 2350 may include many other components that are not shown in FIG. 24. The I/O components 2350 are grouped according to functionality merely for simplifying the following discussion and the grouping is in no way limiting. In various example embodiments, the I/O components 2350 may include output components 2420 and input components 2422. The output components 2420 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 2422 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 2350 may include biometric components 2424, motion components 2426, environmental components 2428, or position components 2430, among a wide array of other components. For example, the biometric components 2424 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 2426 may include acceleration sensor components (e.g., accelerometer), gravitation sensor components, rotation sensor components (e.g., gyroscope), and so forth. The environmental components 2428 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 2430 may include location sensor components (e.g., a global positioning system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 2350 may include communication components 2434 operable to couple the machine 2400 to a network 2438 or devices 2432 via a coupling 2414 and a coupling 2436, respectively. For example, the communication components 2434 may include a network interface component or another suitable device to interface with the network 2438. In further examples, the communication components 2434 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 2432 may be another machine or any of a wide variety of peripheral devices (e.g., a peripheral device coupled via a USB).

Moreover, the communication components 2434 may detect identifiers or include components operable to detect identifiers. For example, the communication components 2434 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 2434, such as location via IP geolocation, location via Wi-Fi® signal triangulation, location via detecting an NFC beacon signal that may indicate a particular location, and so forth.

The various memories (i.e., memory 2348, main memory 2412, and/or static memory 2410) and/or storage unit 2416 may store one or more sets of instructions and data structures (e.g., software) embodying or utilized by any one or more of the methodologies or functions described herein. These instructions (e.g., the instructions 2406), when executed by processor(s) 2346, cause various operations to implement the disclosed embodiments. The instructions 2406 may be stored in machine-readable medium 2418.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 2438 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 2438 or a portion of the network 2438 may include a wireless or cellular network, and the coupling 2414 may be a Code Division Multiple Access (CDMA) connection, a Global System for Mobile communications (GSM) connection, or another type of cellular or wireless coupling. In this example, the coupling 2414 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 2406 may be transmitted or received over the network 2438 using a transmission medium via a network interface device (e.g., a network interface component included in the communication components 2434) and utilizing any one of a number of well-known transfer protocols (e.g., hypertext transfer protocol (HTTP)). Similarly, the instructions 2406 may be transmitted or received using a transmission medium via the coupling 2436 (e.g., a peer-to-peer coupling) to the devices 2432. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 2406 for execution by the machine 240, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

Although examples have been described with reference to specific example embodiments or methods, it will be evident that various modifications and changes may be made to these embodiments without departing from the broader scope of the embodiments. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This detailed description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. An apparatus, comprising:
   at least one processor;
   memory coupled to the at least one processor; and
   instructions stored in the memory and executable by the at least one processor to:
   store telemetry data at a plurality of nodes in a data management system, wherein the plurality of nodes are connected to each other via a network, and wherein the plurality of nodes store one or more snapshots of a computing object, the telemetry data comprising a plurality of data points that indicate performance information related to the data management system;
   receive a query at a first node of the plurality of nodes in the data management system, the query comprising a request to display at least a portion of the telemetry data via a user interface associated with the data management system, wherein some or all of the at least the portion of the telemetry data is stored at a second node of the plurality of nodes in the data management system and the second node is different from the first node;
   obtain, based at least in part on the query, a subset of the at least the portion of the telemetry data from the plurality of nodes by running a sparse algorithm on the at least the portion of the telemetry data, wherein the sparse algorithm includes, in the subset of the at least the portion of the telemetry data, data points that:
   are outside a standard deviation band of the at least the portion of the telemetry data,
   are different from one or more previous data points, or
   satisfy respective difference thresholds with respect to the one or more previous data points or one or more subsequent data points; and
   output, in response to the query, an indication of the subset of the at least the portion of the telemetry data for display via the user interface.

2. The apparatus of claim 1, wherein, to obtain the subset of the at least the portion of the telemetry data, the instructions are executable by the at least one processor to cause the apparatus to:
   obtain a first portion of the subset of the at least the portion of the telemetry data from the first node of the plurality of nodes in the data management system; and obtain a second portion of the subset of the at least the portion of the telemetry data from the second node of the plurality of nodes in the data management system.

3. The apparatus of claim 1, wherein the instructions are further executable by the at least one processor to cause the apparatus to:
transmit the some or all of the at least the portion of the telemetry data from the second node to the first node in response to the query.

4. The apparatus of claim 1, wherein, to receive the query at the first node of the plurality of nodes in the data management system, the instructions are executable by the at least one processor to cause the apparatus to:
receive, via the user interface, the request indicating to display telemetry data associated with a designated time range, wherein the subset of the at least the portion of the telemetry data comprises a subset of the plurality of data points that correspond to the designated time range.

5. The apparatus of claim 1, wherein, the instructions are executable by the at least one processor to cause the apparatus to:
determine that a variance of a data point with respect to a previous data point or a subsequent data point is above a threshold, wherein the at least the portion of the telemetry data comprises the previous data point, the data point, and the subsequent data point; and
select the data point to include in the subset of the at least the portion of the telemetry data based at least in part on the determination.

6. The apparatus of claim 1, wherein the performance information comprises system failure information, resource utilization information, system activity information, or a combination thereof.

7. The apparatus of claim 1, wherein the instructions are executable by the at least one processor to cause the apparatus to:
receive the query at the first node of the plurality of nodes in the data management system, wherein a first portion of the subset is obtained from the first node, and wherein a second portion of the subset is obtained from the second node of the plurality of nodes.

8. A method, comprising:
storing telemetry data at a plurality of nodes in a data management system, wherein the plurality of nodes are connected to each other via a network, and wherein the plurality of nodes store one or more snapshots of a computing object, the telemetry data comprising a plurality of data points that indicate performance information related to the data management system;
receiving a query at a first node of the plurality of nodes in the data management system, the query comprising a request to display at least a portion of the telemetry data via a user interface associated with the data management system, wherein some or all of the at least the portion of the telemetry data is stored at a second node of the plurality of nodes in the data management system and the second node is different from the first node;
obtaining, based at least in part on the query, a subset of the at least the portion of the telemetry data from the plurality of nodes by running a sparse algorithm on the at least the portion of the telemetry data, wherein the sparse algorithm includes, in the subset of the at least the portion of the telemetry data, data points that:
are outside a standard deviation band of the at least the portion of the telemetry data,
are different from one or more previous data points, or
satisfy respective difference thresholds with respect to the one or more previous data points; and outputting, in response to the query, an indication of the subset of the at least the portion of the telemetry data for display via the user interface.

9. The method of claim 8, wherein obtaining the subset of the at least the portion of the telemetry data comprises:
obtaining a first portion of the subset of the at least the portion of the telemetry data from the first node of the plurality of nodes in the data management system; and
obtaining a second portion of the subset of the at least the portion of the telemetry data from the second node of the plurality of nodes in the data management system.

10. The method of claim 8, further comprising:
transmitting the some or all of the at least the portion of the telemetry data from the second node to the first node in response to the query.

11. The method of claim 8, wherein receiving the query at the first node of the plurality of nodes in the data management system comprises:
receiving, via the user interface, the request indicating to display telemetry data associated with a designated time range, wherein the subset of the at least the portion of the telemetry data comprises a subset of the plurality of data points that correspond to the designated time range.

12. The method of claim 8, further comprising:
determining that a variance of a data point with respect to a previous data point or a subsequent data point is above a threshold, wherein the at least the portion of the telemetry data comprises the previous data point, the data point, and the subsequent data point; and
selecting the data point to include in the subset of the at least the portion of the telemetry data based at least in part on the determination.

13. The method of claim 8, wherein the performance information comprises system failure information, resource utilization information, system activity information, or a combination thereof.

14. A non-transitory computer-readable medium storing code, the code comprising instructions executable by at least one processor to:
store telemetry data at a plurality of nodes in a data management system, wherein the plurality of nodes are connected to each other via a network, and wherein the plurality of nodes store one or more snapshots of a computing object, the telemetry data comprising a plurality of data points that indicate performance information related to the data management system;
receive a query at a first node of the plurality of nodes in the data management system, the query comprising a request to display at least a portion of the telemetry data via a user interface associated with the data management system, wherein some or all of the at least the portion of the telemetry data is stored at a second node of the plurality of nodes in the data management system and the second node is different from the first node;
obtain, based at least in part on the query, a subset of the at least the portion of the telemetry data from the plurality of nodes by running a sparse algorithm on the at least the portion of the telemetry data, wherein the sparse algorithm includes, in the subset of the at least the portion of the telemetry data, data points that:
are outside a standard deviation band of the at least the portion of the telemetry data,
are different from one or more previous data points, or
satisfy respective difference thresholds with respect to the one or more previous data points; and
output, in response to the query, an indication of the subset of the at least the portion of the telemetry data for display via the user interface.

15. The non-transitory computer-readable medium of claim 14, wherein, to obtain the subset of the at least the portion of the telemetry data, the instructions are executable by the at least one processor to:
- obtain a first portion of the subset of the at least the portion of the telemetry data from the first node of the plurality of nodes in the data management system; and
- obtain a second portion of the subset of the at least the portion of the telemetry data from the second node of the plurality of nodes in the data management system.

16. The non-transitory computer-readable medium of claim 14, wherein the instructions are further executable by the at least one processor to:
- transmit the some or all of the at least the portion of the telemetry data from the second node to the first node in response to the query.

17. The non-transitory computer-readable medium of claim 14, wherein, to receive the query at the first node of the plurality of nodes in the data management system, the instructions are executable by the at least one processor to:
- receive, via the user interface, the request indicating to display telemetry data associated with a designated time range, wherein the subset of the at least the portion of the telemetry data comprises a subset of the plurality of data points that correspond to the designated time range.

* * * * *